United States Patent
Whear et al.

(10) Patent No.: US 12,148,951 B2
(45) Date of Patent: Nov. 19, 2024

(54) SEPARATORS, LEAD ACID BATTERIES, AND METHODS AND SYSTEMS ASSOCIATED THEREWITH

(71) Applicant: DARAMIC, LLC, Charlotte, NC (US)

(72) Inventors: J. Kevin Whear, Utica, KY (US); Mohammed Naiha, Chatenois (FR)

(73) Assignee: Daramic, LLC, Charlotte, NC (US)

( * ) Notice: Subject to any disclaimer, the term of this patent is extended or adjusted under 35 U.S.C. 154(b) by 0 days.

(21) Appl. No.: 17/723,466

(22) Filed: Apr. 19, 2022

(65) Prior Publication Data
US 2022/0238957 A1    Jul. 28, 2022

Related U.S. Application Data

(62) Division of application No. 16/495,132, filed as application No. PCT/US2018/023728 on Mar. 22, 2018, now Pat. No. 11,335,974.

(51) Int. Cl.
*H01M 50/446* (2021.01)
*H01M 10/06* (2006.01)
(Continued)

(52) U.S. Cl.
CPC ......... *H01M 50/446* (2021.01); *H01M 10/06* (2013.01); *H01M 10/12* (2013.01);
(Continued)

(58) Field of Classification Search
CPC .. H01M 50/44; H01M 50/446; H01M 50/443; H01M 50/20
See application file for complete search history.

(56) References Cited

U.S. PATENT DOCUMENTS

| | | | |
|---|---|---|---|
| 6,410,183 B2 * | 6/2002 | Weerts | H01M 50/463 429/129 |
| 2002/0034689 A1 * | 3/2002 | Hoshida | B29C 55/005 428/317.9 |

(Continued)

FOREIGN PATENT DOCUMENTS

| | | |
|---|---|---|
| WO | WO 02/095846 | 11/2002 |
| WO | WO 2014/151991 | 9/2014 |

OTHER PUBLICATIONS

Bohnstedt, Werner, "Aspects of Optimizing Polyethylene Separators," from Journal of Power Sources 95 (2001), pp. 234-240.

*Primary Examiner* — Kenneth J Douyette
(74) *Attorney, Agent, or Firm* — Hammer & Associates, P.C.

(57) ABSTRACT

A separator is provided with a novel construction and/or a combination of improved properties. Batteries, methods, and systems associated therewith are also provided. In certain embodiments, novel or improved separators, battery separators, enhanced flooded battery separators, batteries, cells, and/or methods of manufacture and/or use of such separators, battery separators, enhanced flooded battery separators, cells, and/or batteries are provided. In addition, there is disclosed herein methods, systems, and battery separators having a reduced ER, improved puncture strength, improved separator CMD stiffness, improved oxidation resistance, reduced separator thickness, reduced basis weight, and any combination thereof. In accordance with at least certain embodiments, separators are provided in battery applications for flat-plate batteries, tubular batteries, vehicle SLI, and HEV ISS applications, deep cycle applications, golf car or golf cart, and e-rickshaw batteries, batteries operating in a partial state of charge ("PSOC"), inverter batteries; and storage batteries for renewable energy sources, and any combination thereof.

19 Claims, 6 Drawing Sheets

(51) Int. Cl.
  *H01M 10/12*   (2006.01)
  *H01M 50/414*  (2021.01)
  *H01M 50/417*  (2021.01)
  *H01M 50/429*  (2021.01)
  *H01M 50/44*   (2021.01)
  *H01M 50/443*  (2021.01)
  *H01M 50/451*  (2021.01)
  *H01M 50/463*  (2021.01)
  *H01M 50/489*  (2021.01)

(52) U.S. Cl.
  CPC ....... *H01M 10/126* (2013.01); *H01M 50/414* (2021.01); *H01M 50/417* (2021.01); *H01M 50/429* (2021.01); *H01M 50/44* (2021.01); *H01M 50/443* (2021.01); *H01M 50/451* (2021.01); *H01M 50/463* (2021.01); *H01M 50/489* (2021.01); *H01M 2220/20* (2013.01)

(56) References Cited

U.S. PATENT DOCUMENTS

| | | | |
|---|---|---|---|
| 2008/0299462 A1* | 12/2008 | Whear | H01M 10/06 429/247 |
| 2012/0070747 A1 | 3/2012 | Whear et al. | |
| 2012/0009418 A1 | 4/2012 | Deiters et al. | |
| 2015/0207121 A1 | 7/2015 | Frenzel et al. | |
| 2016/0329540 A1* | 11/2016 | Miller | H01M 10/121 |
| 2017/0054123 A1* | 2/2017 | Miller | H01M 50/437 |

* cited by examiner

A—A

B—B

SEPARATORS, LEAD ACID BATTERIES, AND METHODS AND SYSTEMS ASSOCIATED THEREWITH

RELATED APPLICATIONS

This application is a divisional application which claims priority to U.S. application Ser. No. 16/495,132, now U.S. Pat. No. 11,335,974, filed Sep. 18, 2019, which claims priority to and benefit of International Application No. PCT/US2018/023728 filed Mar. 22, 2018, the contents which are incorporated herewith.

FIELD

In accordance with at least selected embodiments, the present disclosure or invention is directed to novel or improved membranes, separators, battery separators, enhanced flooded battery separators, batteries, cells, systems, methods, and/or vehicles using the same, and/or methods of manufacture and/or use of such separators, battery separators, enhanced flooded battery separators, batteries, cells, systems, and/or vehicles using the same. In accordance with at least certain embodiments, the present disclosure or invention is directed to novel or improved enhanced flooded lead acid battery separators for inverter batteries, flooded batteries for deep cycle applications, vehicle batteries, such as automotive starting lighting ignition ("SLI") batteries, batteries for automotive idle-start-stop ("ISS") applications, such as those used in hybrid-electric vehicles, and/or enhanced flooded batteries ("EFB") and/or improved methods of making and/or using such improved separators, cells, batteries, systems, vehicles, and/or the like. In accordance with at least certain embodiments, the present disclosure or invention is directed to an improved separator for enhanced flooded batteries and/or improved methods of making, testing, and/or using such batteries having such improved separators. In accordance with at least selected embodiments, the present disclosure or invention is directed to separators, particularly separators for enhanced flooded batteries having reduced separator electrical resistance ("ER"), reduced separator thickness, increased separator puncture strength, improved separator cross-machine direction ("CMD") stiffness, improved separator oxidation resistance, lowered separator basis weight, increased separator wettability, or any combination thereof. In addition, disclosed herein are methods, systems, and battery separators for enhancing battery life, reducing water loss, increasing wettability, reducing internal resistance, and/or improving uniformity in at least enhanced flooded batteries. In accordance with at least particular embodiments, the present disclosure or invention is directed to an improved separator for enhanced flooded batteries wherein the separator includes one or more performance enhancing additives or coatings, reduced electrical resistance, reduced thickness, increased puncture strength, improved CMD stiffness, improved oxidation resistance, lowered basis weight, or any combination thereof.

BACKGROUND

Enhanced flooded batteries ("EFBs" or "EFB") and absorbent glassmat ("AGM") batteries have been developed to meet the expanding need for electric power sources used in a variety of applications. EFB systems have similar architecture to traditional flooded lead acid batteries, in which positive and/or negative electrodes are surrounded by a microporous separator and submerged in a liquid electrolyte. AGM systems, on the other hand, do not contain free liquid electrolyte. Instead, the electrolyte is absorbed into a glass fiber mat which is then layered on top of the electrodes. Historically, AGM systems have been associated with higher discharge power, better cycle life, and greater cold cranking amps than flooded battery systems. However, AGM batteries are significantly more expensive to manufacture and are more sensitive to overcharging. As such, EFB systems remain an attractive option for power sources and energy storage solutions for mobile as well as stationary applications. Such power source and energy storage applications are as varied as: flat-plate batteries; tubular batteries; vehicle SLI, and hybrid-electric vehicle ISS applications; deep cycle applications; golf car or golf cart and e-rickshaw batteries; batteries operating in a partial state of charge ("PSOC"); inverter batteries; and storage batteries for renewable energy sources.

EFB systems typically include one or more battery separators that separate the positive electrode(s) from the negative electrode(s) within a lead acid battery cell. A battery separator may have two primary functions. First, a battery separator should keep the positive electrode(s) physically apart from the negative electrode(s) in order to prevent any electronic current directly passing between the electrodes (electrical short). Second, a battery separator should permit an ionic current between the positive and negative electrodes with the least possible ER. A battery separator can be made out of many different materials, but these two opposing functions have been met well by a battery separator being made of a porous nonconductor. With this structure, pores contribute to ionic diffusion between electrodes, and a non-conducting polymeric network prevents electronic shorting.

In addition, characteristics of a battery separator, other than those listed above, may also be desired. For instance, in addition to a reduced electrical resistance (ER), it may be desired for a separator to have improved puncture strength, improved separator cross machine direction (CMD) stiffness, improved oxidation resistance, reduced separator thickness, and reduced basis weight.

A lower separator ER may improve battery functionality and increase its charge acceptance (reduces the time to recharge, and/or reduces the charge current and/or voltage). If the puncture strength is too low, then the separator may be punctured at the corners of the lead alloy electrodes during assembly or anytime thereafter, which will lead to a short and premature battery failure. If the CMD stiffness is too low or too high, then it may be difficult for the separator to be properly handled during battery assembly. Furthermore, it may be desired for a battery separator to have improved oxidation stability, which leads to a longer battery cycle life. A lower basis weight may reduce manufacturing costs. Also, a reduced separator thickness may be desired to reduce the overall size of the battery.

All of the above characteristics may lead to other desired traits of a lead acid battery, such as, for instance, increased room for more electrolyte, a reduced amount of lead in the electrodes, a reduced battery size, and/or reduced time to recharge a battery, just to name a few improvements.

Typical battery separators are microporous so that ions may pass therethrough between the positive and negative electrodes or plates. Separators can be fashioned from polyolefins, such as polyethylene and polypropylene, wood, paper, natural or synthetic rubber, PVC, or fiberglass. In lead acid storage batteries, such as automotive batteries and/or industrial batteries and/or deep cycle batteries, the battery separator is typically a microporous polyethylene separator; in some cases, such a separator may include a backweb and a plurality of ribs standing on one or both sides of the backweb. See: Besenhard, J. O., Editor, Handbook of Battery Materials, Wiley-VCH Verlag GmbH, Weinheim, Germany (1999), Chapter 9, pp. 245-292. Some separators for automotive batteries are made in continuous lengths and rolled, subsequently folded, and sealed along the edges (or certain edges) to form pouches or envelopes or sleeves or pockets that receive the electrodes for the batteries. Certain separators, for example, for industrial (or traction or deep cycle storage) batteries are cut to a size about the same as an electrode plate (pieces or leaves).

For at least certain applications or batteries, there remains a need for improved separators providing for reducing ER, reducing separator thickness, increasing separator puncture strength, improving separator CMD stiffness, improving separator oxidation resistance, lowering separator basis weight, increasing separator wettability, or any combination thereof. More particularly, there remains a need for improved separators, and improved batteries comprising an improved separator, which provides for enhancing battery life, reducing battery failure, improving oxidation stability, improving end of charge ("EOC") current, decreasing the current and/or voltage and/or time needed to charge and/or fully charge the battery, minimizing internal ER, improving puncture strength, improving separator stiffness, reducing separator thickness, and/or lowering separator basis weight. Embodiments of exemplary separators may be used in a variety of lead acid batteries, such as EFBs, flooded batteries used in deep cycle batteries applications, vehicles using such batteries, such as automotive SLI batteries, hybrid-electric vehicle ISS batteries, and/or inverter batteries.

SUMMARY

The details of one or more embodiments are set forth in the descriptions below. Other features, objects, and advantages will be apparent from the description and from the claims. In accordance with at least selected embodiments, the present disclosure or invention may address the above issues or needs. In accordance with at least certain objects, aspects, or embodiments, the present disclosure or invention may provide or disclose novel or improved membranes, separators, battery separators, enhanced flooded battery separators, batteries, cells, systems, methods, and/or vehicles using the same, and/or methods of manufacture and/or use of such separators, battery separators, enhanced flooded battery separators, batteries, cells, systems, and/or vehicles using the same. In accordance with at least certain embodiments, the present disclosure or invention is directed to novel or improved enhanced flooded lead acid battery separators for inverter batteries, flooded batteries for deep cycle applications, vehicle batteries, such as automotive starting lighting ignition ("SLI") batteries, batteries for automotive idle-start-stop ("ISS") applications, such as those used in hybrid-electric vehicles, and/or enhanced flooded batteries ("EFB") and/or improved methods of making and/or using such improved separators, cells, batteries, systems, vehicles, and/or the like. In accordance with at least certain embodiments, the present disclosure or invention is directed to an improved separator for enhanced flooded batteries and/or improved methods of making, testing, and/or using such batteries having such improved separators. In accordance with at least selected embodiments, the present disclosure or invention is directed to separators, particularly separators for enhanced flooded batteries having reduced separator electrical resistance ("ER"), reduced separator thickness, increased separator puncture strength, improved separator cross-machine direction ("CMD") stiffness, improved separator oxidation resistance, lowered separator basis weight, increased separator wettability, or any combination thereof. In addition, disclosed herein are methods, systems, and battery separators for enhancing battery life, reducing water loss, increasing wettability, reducing internal resistance, and/or improving uniformity in at least enhanced flooded batteries. In accordance with at least particular embodiments, the present disclosure or invention is directed to an improved separator for enhanced flooded batteries wherein the separator includes one or more performance enhancing additives or coatings, reduced electrical resistance, reduced thickness, increased puncture strength, improved CMD stiffness, improved oxidation resistance, lowered basis weight, or any combination thereof.

In accordance with at least selected embodiments, the present disclosure or invention is directed to or may provide improved separators and/or batteries which overcomes the aforementioned problems. For instance, methods, systems, and improved battery separators, providing for reduced ER, reduced separator thickness, increased separator puncture strength, improved separator CMD stiffness, improved separator oxidation resistance, lowered separator basis weight, or any combination thereof.

In select embodiments of the present invention, a lead acid battery separator may be provided a basis weight of approximately 130 $g/m^2$ or less, and a bending stiffness in the cross-machine direction of greater than or equal to approximately 25 mN.

In certain other select embodiments of the present invention, a lead acid battery separator may be provided with a cross-machine direction stiffness of less than or equal to approximately 25 mN, and a backweb thickness less than or equal to approximately 125 μm.

In some aspects of the present invention, the separator may be provided with an electrical resistance of less than or equal to approximately 40 $m\Omega \cdot cm^2$; an average puncture resistance of greater than or equal to approximately 11.0 N; an oxidation resistance at 20 hours of greater than or equal to approximately 200%; an oxidation resistance at 40 hours of greater than or equal to approximately 100%; a backweb thickness of less than or equal to approximately 125 μm; a residual oil content of less than or equal to about 20%; a porous membrane having a residual oil content of greater than or equal to about 10%.

In other aspects of the present invention, the lead acid battery separator may have at least one array of ribs, wherein the at least one array of ribs are at least one from the group consisting of: solid ribs, broken ribs, discrete broken ribs, continuous ribs, discontinuous ribs, angled ribs, linear ribs, longitudinal ribs extending substantially in a machine direction of the porous membrane, lateral ribs extending substantially in a cross-machine direction of the porous membrane, transverse ribs extending substantially in a cross-machine direction of the porous membrane, cross ribs extending substantially in a cross-machine direction of the porous membrane, serrations, serrated ribs, battlements or battlemented ribs, curved or sinusoidal ribs, disposed in a solid or broken zig-zag-like fashion, grooves, channels, textured areas, embossments, dimples, porous, non-porous, mini ribs or cross-mini ribs, and combinations thereof.

In select embodiments, the separator may have a first array of ribs extending from a first backweb surface, and having a first rib height as measured from the first backweb surface; a second array of ribs extending from the second backweb surface and being substantially orthogonal to the first array of ribs, and having a second rib height as measured from the second backweb surface; and a baseweb thickness of less than or equal to approximately 200 µm. The second array of ribs may have a height of less than or equal to about 75 µm, and a backweb thickness of less than or equal to about 100 µm.

Exemplary separators may have an overall thickness of between about 400 µm to about 2.0 mm.

In certain exemplary embodiments, the lead acid battery separator may have a first array of ribs being at least one from the group consisting of: solid ribs, broken ribs, discrete broken ribs, continuous ribs, discontinuous ribs, angled ribs, linear ribs, longitudinal ribs extending substantially in a machine direction of the porous or microporous membrane, lateral ribs extending substantially in a cross-machine direction of the porous membrane, transverse ribs extending substantially in a cross-machine direction of the porous membrane, cross ribs extending substantially in a cross-machine direction of the porous membrane, serrations, serrated ribs, battlements or battlemented ribs, curved or sinusoidal ribs, disposed in a solid or broken zig-zag-like fashion, grooves, channels, textured areas, embossments, dimples, porous, non-porous, mini ribs or cross-mini ribs, and combinations thereof.

In other select embodiments, the lead acid battery separator may have a second array of ribs being at least one from the group consisting of: solid ribs, broken ribs, discrete broken ribs, continuous ribs, discontinuous ribs, angled ribs, linear ribs, longitudinal ribs extending substantially in a machine direction of the porous membrane, lateral ribs extending substantially in a cross-machine direction of the porous membrane, transverse ribs extending substantially in a cross-machine direction of the porous membrane, cross ribs extending substantially in a cross-machine direction of the porous membrane, serrations, serrated ribs, battlements or battlemented ribs, curved or sinusoidal ribs, disposed in a solid or broken zig-zag-like fashion, grooves, channels, textured areas, embossments, dimples, porous, non-porous, mini ribs or cross-mini ribs, and combinations thereof.

In select embodiments, the present invention provides a lead acid battery provided with a separator as substantially described herein. The battery may be a flat-plate battery, a tubular battery, a flooded lead acid battery, an enhanced flooded lead acid battery, a deep-cycle battery, an absorptive glass mat battery, a tubular battery, an inverter battery, a vehicle battery, a starting-lighting-ignition ("SLI") battery, an idle-start-stop ("ISS") battery, an automobile battery, a truck battery, a motorcycle battery, an all-terrain vehicle battery, a forklift battery, a golf cart battery, a hybrid-electric vehicle battery, an electric vehicle battery, an e-rickshaw battery, an e-bike battery, or a marine vessel battery.

The battery may operate in a partial state of charge; while in motion; or while stationary; or cycle through all of the above.

In certain select embodiments, the present invention provides a vehicle provided with a lead acid battery provided with a separator as substantially described herein. The vehicle may be an automobile, a truck, a motorcycle, an all-terrain vehicle, a forklift, a golf cart, an idle-start-stop vehicle; a hybrid-electric vehicle, an electric vehicle, an e-rickshaw, an e-bike, or a marine vessel.

Novel or improved separators, battery separators, enhanced flooded battery separators, batteries, cells, systems, methods, and/or methods of manufacture and/or use of such separators, battery separators, enhanced flooded battery separators, cells, systems, and/or batteries; novel or improved battery separators for enhanced flooded batteries; methods, systems, and battery separators having a reduced ER, improved puncture strength, improved separator CMD stiffness, improved oxidation resistance, reduced separator thickness, reduced basis weight, and any combination thereof; an improved separator for enhanced flooded batteries wherein the separator has a reduced ER, improved puncture strength, improved separator CMD stiffness, improved oxidation resistance, reduced separator thickness, reduced basis weight, or any combination thereof; separators are provided that include or exhibit a reduced ER, improved puncture strength, improved separator CMD stiffness, improved oxidation resistance, reduced separator thickness, reduced basis weight, and any combination thereof; separators are provided in battery applications for flat-plate batteries, tubular batteries, vehicle SLI, and HEV ISS applications, deep cycle applications, golf car or golf cart, and e-rickshaw batteries, batteries operating in a partial state of charge ("PSOC"), inverter batteries; and storage batteries for renewable energy sources, and any combination thereof; and/or the like as shown, claimed or described herein.

In accordance with at least selected embodiments, the present disclosure or invention is directed to novel or improved separators, battery separators, enhanced flooded battery separators, batteries, cells, systems, methods, and/or vehicles using the same, and/or methods of manufacture and/or use of such separators, battery separators, enhanced flooded battery separators, batteries, cells, systems, and/or vehicles using the same. In accordance with at least certain embodiments, the present disclosure or invention is directed to novel or improved enhanced flooded lead acid battery separators for inverter batteries, flooded batteries for deep cycle applications, vehicle batteries, such as automotive starting lighting ignition ("SLI") batteries, batteries for automotive idle-start-stop ("ISS") applications, such as those used in hybrid-electric vehicles, and/or enhanced flooded batteries ("EFB") and/or improved methods of making and/or using such improved separators, cells, batteries, systems, vehicles, and/or the like. In accordance with at least certain embodiments, the present disclosure or invention is directed to an improved separator for enhanced flooded batteries and/or improved methods of making, testing, and/or using such batteries having such improved separators. In accordance with at least selected embodiments, the present disclosure or invention is directed to separators, particularly separators for enhanced flooded batteries having reduced separator electrical resistance ("ER"), reduced separator thickness, increased separator puncture strength, improved separator cross-machine direction ("CMD") stiffness, improved separator oxidation resistance, lowered separator basis weight, increased separator wettability, or any combination thereof. In addition, disclosed herein are methods, systems, and battery separators for enhancing battery life, reducing water loss, increasing wettability, reducing internal resistance, and/or improving uniformity in at least enhanced flooded batteries. In accordance with at least particular embodiments, the present disclosure or invention is directed to an improved separator for enhanced flooded batteries wherein the separator includes one or more performance enhancing additives or coatings, reduced electrical resistance, reduced thickness, increased puncture strength, improved CMD stiffness, improved oxidation resistance, lowered basis weight, or any combination thereof.

In accordance with at least selected embodiments, the present disclosure is directed to improved lead acid batteries, such as flooded lead acid batteries, improved systems that include a lead acid battery, and/or a battery separator, improved battery separators, improved vehicles including such systems, methods of manufacture, testing, or use, or combinations thereof. In accordance with at least certain embodiments, the present disclosure or invention is directed to improved flooded lead acid batteries, improved battery separators for such batteries, and/or methods of manufacturing, testing, or using such improved flooded lead acid batteries, or combinations thereof. In addition, disclosed herein is a method, system, battery, and/or battery separator for reducing electrical resistance, reducing separator thickness, increasing separator puncture strength, improving separator CMD stiffness, improving separator oxidation resistance, lowering separator basis weight, increasing separator wettability, or any combination thereof.

BRIEF DESCRIPTION OF THE DRAWINGS

FIG. 3A schematically depicts a positive electrode facing surface of an exemplary separator. FIG. 3B is a cross-sectional view (as defined by A-A in FIG. 3A) of an exemplary separator shown along the machine direction. FIG. 3C is a cross-sectional view (as defined by b-b FIG. 3B) of an exemplary separator shown along the cross-machine direction.

DETAILED DESCRIPTION

Embodiments described herein can be understood more readily by reference to the following detailed description, examples, and figures (i.e., "FIGS."). Among other things, various batteries, vehicles, or devices, and methods for preventing acid stratification, among other things, are described herein, however, such are not limited to the specific embodiments presented in the detailed description, examples, and figures. It should be recognized that these embodiments are merely illustrative of the principles of the present invention. Numerous modifications and adaptations will be readily apparent to those of skill in the art without departing from the disclosed subject matter.

Lead Acid Battery

Figure 1:
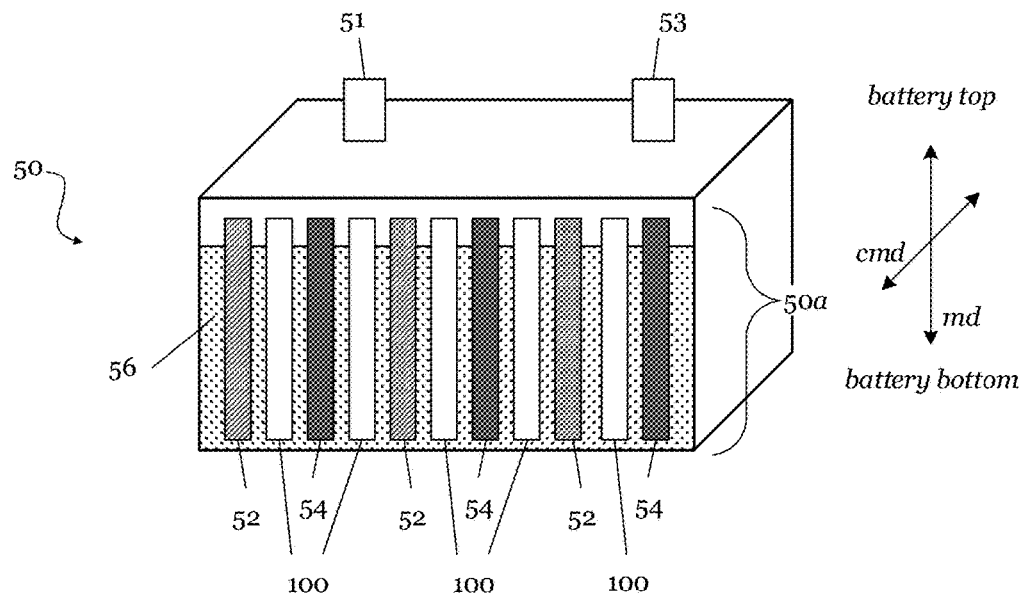
FIG. 1 schematically illustrates an exemplary flooded lead acid battery.

Referring to FIG. 1, an exemplary flooded lead acid battery 50, such as an EFB, is provided with an array 50a of alternating positive electrodes 52 and negative electrodes 54, such that the positive electrodes 52 and negative electrodes 54 are interleaved between one another. The array 50a is further provided with a separator 100 interleaved between each electrode 52, 54, such that the separator 100 separates the electrodes 52, 54 to prevent contact between the electrodes 52, 54. The array 50a is substantially submerged in a sulfuric acid ($H_2SO_4$) electrolyte 56 (e.g., sulfuric acid with an exemplary specific weight with respect to water of between about 1.20 and about 1.35). The positive electrodes 52 are in electrical communication with the positive terminal 51, and negative electrodes 54 are in electrical communication with the negative terminal 53.

Figure 2:
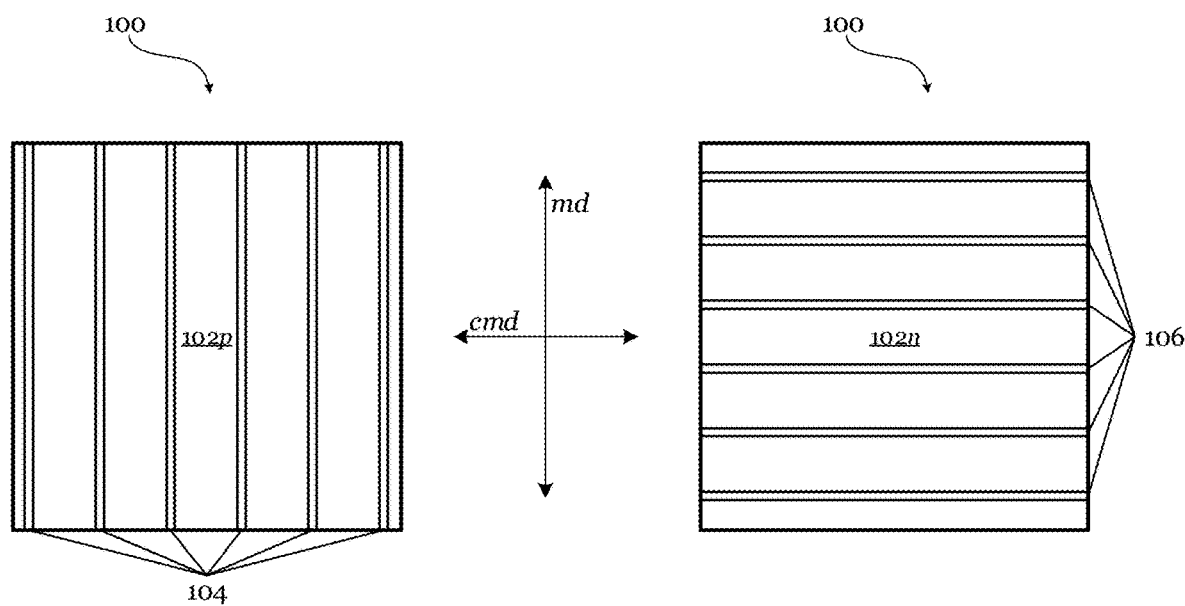
FIG. 2 schematically illustrates two exemplary surfaces of an inventive separator.

Referring now to FIG. 2, the separators 100 include a porous membrane and may additionally be provided with one or more arrays of ribs extending from the porous membrane 102 on either or both surfaces thereof. The porous membrane 102 is provided with a positive electrode facing surface 102p, because this surface would face a positive electrode when the separator is placed in a lead acid battery; and a negative electrode facing surface 102n, because this surface would face a negative electrode when placed in a lead acid battery. Positive ribs 104 may extend from the positive electrode facing surface 102p, and negative ribs 106 may extend from the negative electrode facing surface 102n. The separator is further provided with a machine direction and a cross-machine direction as delineated by the arrows denoted by md for machine direction and cmd for cross-machine direction, with the two directions being substantially orthogonal to one another. Exemplary separators may have positive ribs 104 extending substantially in the machine direction md, and negative ribs 106 extending substantially in the cross-machine direction cmd. Referring back to FIG. 1, the machine direction md of exemplary separators 100 substantially runs between the top and bottom of the battery 50, while the cross-machine direction cmd is substantially orthogonal to the machine direction md.

In addition, exemplary separators 100 may be coupled with, adjacent to, or laminated with one or more fibrous mat(s) (not shown).

The lead acid batteries described herein are not so limited and may be flooded lead acid batteries, such as enhanced flooded lead acid batteries, absorbent glass mat ("AGM") batteries, valve regulated lead acid ("VRLA") batteries, gel batteries, and/or the like. In some preferred embodiments, the lead acid batteries described herein are flooded lead acid batteries, at least because some of the disclosure herein is directed at solving a problem of flooded lead acid batteries, particularly flooded lead acid batteries operating at a partial state of charge or in a partial state of charge, namely acid stratification and active material shedding.

As described herein, exemplary separators may be used in lead acid batteries that are utilized in a variety of applications. Such applications may include, for example: partial state of charge applications; deep-cycling applications; automobile applications; truck applications; motorcycle applications; motive power applications, such as fork trucks, golf carts (also called golf cars), and the like; electric vehicle applications; hybrid-electric vehicle ("HEVs") applications; ISS vehicle applications; e-rickshaw applications; e-trike applications; e-bike applications; boat applications; energy collection and storage applications, such as renewable and/or alternative energy collection and storage, such as wind energy, solar energy, and the like. In addition, exemplary separators may be used in a variety of batteries. Such exemplary batteries may include, for example: flooded lead acid batteries, such as enhanced flooded lead acid batteries; AGM batteries; VRLA batteries; plate batteries; tubular batteries; partial state of charge batteries; deep-cycling batteries; automobile batteries; truck batteries; motorcycle batteries; motive power batteries, such as fork truck batteries, golf cart (also called golf cars) batteries, and the like; electric vehicle batteries; hybrid-electric vehicle ("HEVs") batteries; ISS vehicle batteries; e-rickshaw batteries; e-trike batteries; e-bike batteries; boat batteries; energy collection and storage batteries, such as renewable and/or alternative energy collection and storage, such as wind energy, solar energy, and the like.

Separator

The separator 100 must prevent electrical conductance between the electrodes 52, 54 yet allow ionic conductance between the electrodes 52, 54. Therefore, exemplary embodiments of an inventive separator 100 preferably includes a porous membrane, such as a microporous membrane having pores less than about 5 µm, preferably lees than about 1.0 µm, a mesoporous membrane, or a macroporous membrane having pores greater than about 1.0 µm. In certain preferred embodiments, an exemplary porous membrane is a microporous membrane having pore diameters of about 0.1 µm and a porosity of about 60% to about 68%.

The porous membrane is not so limited and may be any porous membrane; a porous membrane with any size pore (e.g., macroporous, microporous, nanoporous, etc.) and being made from any material resistance to the acidic electrolyte. In some preferred embodiments, the porous membrane is a microporous membrane such as a battery separator. For example, the microporous membrane may be any polyethylene battery separator manufactured by Daramic® or any other lead acid battery separator manufacturer, now or in the future.

In some embodiments, the pore size of the porous membrane is less than 5 preferably less than 1 µm. Preferably more than 50% of the pores are 0.5 µm or less. It may be preferred that at least 90% of the pores have a diameter of less than 0.9 µm. The microporous separator preferably has an average pore size within the range of 0.05 µm-0.9 µm, in some instances, 0.1 µm-0.3 µm.

Physical Description

Figure 3A:
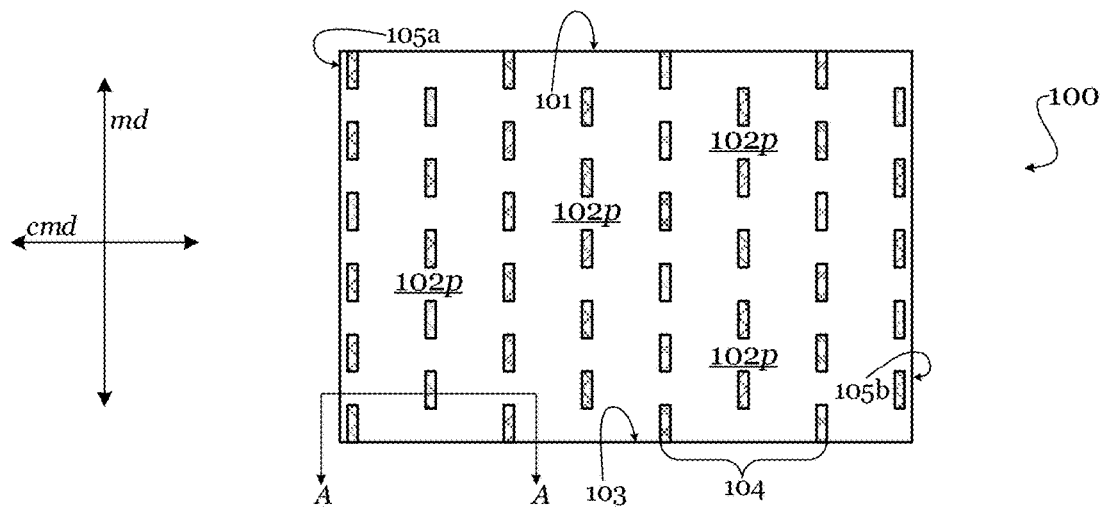
FIGS. 3A through 3c depict embodiments of an exemplary separator and its various key dimensions.
Figure 3B:
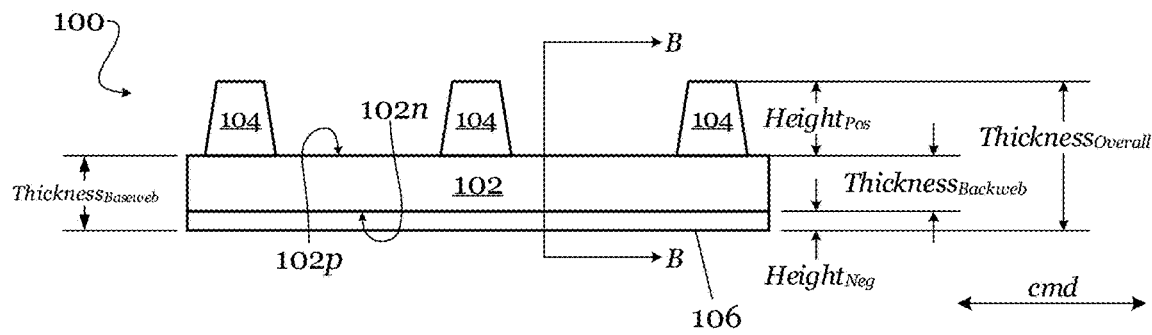
Figure 3C:
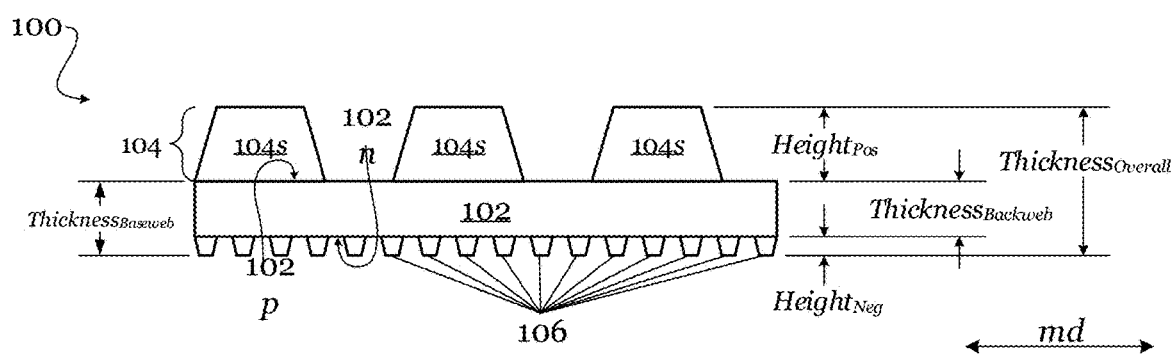

With reference now to FIGS. 3A-3C, an exemplary separator 100 has a top edge 101, a bottom edge 103, lateral side edges 105a, 105b, a machine direction ("MD") and a cross-machine direction ("CMD"). An exemplary separator 100 may be provided with a backweb 102 of a porous membrane, and a series of major or positive ribs 104 extending from a positive electrode facing surface 102p. As shown, the ribs 104 are segmented or serrated. However, the ribs 104 may be ribs, grooves, textured areas, serrations or serrated ribs, solid ribs, battlements or battlemented ribs, broken ribs, angled ribs, linear ribs, or curved or sinusoidal ribs, zig-zag ribs, embossments, dimples, and/or the like extending into or from the backweb 102, or any combination thereof. Exemplary embodiments place the separator 102 in a battery (not shown) with the ribs 104 facing a positive electrode (not shown), but this is not necessary. Should the ribs 104 face a positive electrode, they may be known as positive ribs. FIG. 3B shows the separator 100 along a machine direction and detailing a backweb thickness Thickness$_{Backweb}$, a positive rib height Height$_{Pos}$, and a negative rib height Height$_{Neg}$ are shown, the combination of which equals the overall separator thickness Thickness$_{Overall}$. FIG. 3B further shows a baseweb thickness Thickness$_{Baseweb}$ that is the sum of the backweb thickness Thickness$_{Backweb}$, and the negative rib height Height$_{Neg}$. FIG. 3C shows the separator 100 along a cross-machine direction showing the negative ribs 106 as laterally disposed in a cross-machine direction (discussed hereinafter and further referred to as "negative cross-ribs" or "NCR" or "NCRs"). FIG. 3C further shows the positive rib serrations 104s. The separator 100 will typically be placed in a battery positioning the negative cross-ribs toward the negative electrode, however this is not necessary. Without negative cross-ribs, the backweb thickness Thickness$_{Backweb}$ is equal to the baseweb thickness Thickness$_{Baseweb}$. It is appreciated that FIGS. 3A through 3C are not to scale.

Ribs

In certain select aspects of the present invention, either or both arrays of positive and/or negative ribs may be solid ribs, discrete broken ribs, continuous ribs, discontinuous ribs, angled ribs, linear ribs, longitudinal ribs extending substantially in a machine direction of the porous membrane, lateral ribs extending substantially in a cross-machine direction of the porous membrane, transverse ribs extending substantially in a cross-machine direction of the porous membrane, cross ribs extending substantially in a cross-machine direction of the porous membrane, serrations, serrated ribs, battlements or battlemented ribs, curved or sinusoidal ribs, disposed in a solid or broken zig-zag-like fashion, grooves, channels, textured areas, embossments, dimples, porous, non-porous, mini ribs or cross-mini ribs, and/or the like, and/or combinations thereof.

In various possibly preferred embodiments, the porous membrane 102 may possess ribs 104, 106, which may be positive ribs or negative cross-ribs, disposed on either surface of the membrane 102. The ribs 104, 106 may be ribs, grooves, textured areas, serrations or serrated ribs, solid ribs, battlements or battlemented ribs, broken ribs, angled ribs, linear ribs, or curved or sinusoidal ribs, zig-zag ribs, embossments, dimples, and/or the like extending in to or from the backweb, or any combination thereof. In some embodiments, the ribs may be in a pattern such as they may be on only one surface of the porous membrane, or on both surfaces of the membrane. The separator may include positive ribs on a first side or surface or positive side or surface or front side or surface of the porous membrane, and negative cross-ribs on a second side or negative side or back side of the separator. Such negative cross-ribs may be smaller and more closely spaced than the positive ribs. The positive ribs 104 may have a height Height$_{Pos}$ of between 8 µm to 1 mm and may be spaced 1 µm to 20 mm apart, while the preferred backweb thickness Thickness$_{Backweb}$ of the microporous polyolefin porous membrane (not including the ribs or embossments) may be about 50 µm to about 500 µm (for instance, in certain embodiments, less than or equal to about 125 µm). For example, the ribs can be 0.05 mm, 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, and in similar increments up to 20 mm apart.

The NCRs 106 may have a height Height$_{Neg}$ of between about 25 µm to about 100 µm, and preferably about 50 µm-75 µm, but may be as small as 25 µm. In some instances, the NCRs 106 may be about 25 µm to about 250 µm, or preferably be about 50 µm-125 µm, or preferably between about 50 µm-75 µm.

In some embodiments, positive ribs 104 may be on a first surface of the porous membrane 102 and negative or negative cross-ribs 106 may be on a second surface of the porous membrane and substantially 90° relative to the positive ribs 104. In some embodiments, positive ribs 104 may be on a first surface of the porous membrane 102 and disposed generally orthogonal to a top edge 101 of the separator 100, and negative or negative cross-ribs 106 may be on a second surface of the porous membrane 102 and disposed generally parallel to the top edge 101 of the separator 100. In some embodiments, positive ribs 104 may be on a first surface of the porous membrane and disposed generally parallel to a machine direction md of the separator 100, and negative or negative cross-ribs 106 may be on a second surface of the porous membrane 102 and disposed generally parallel to a cross-machine direction cmd of the separator. In some embodiments, positive ribs 104 may be on a first surface of the porous membrane and disposed at an angular orientation relative to the machine direction md of the separator 100 at an angle between greater than about 0° and less than about 180° or greater than about 180° and less than about 360°, and negative or negative cross-ribs 106 may be on a second surface of the porous membrane and disposed generally parallel to a top edge 101 or a cross-machine direction cmd of the separator 100. In some embodiments, positive ribs 104 may be on a first surface of the porous membrane, and negative mini ribs 106 may be on a second surface of the porous membrane 102 and disposed generally parallel to the positive ribs 104 on the first surface of the porous membrane.

The ribs may be serrated in certain preferred embodiments. The serrations or serrated ribs may have an average tip length of from about 0.05 mm to about 1 mm. For example, the average tip length can be greater than or equal to 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to 1.0 mm, 0.9 mm, 0.8 mm, 0.7 mm, 0.6 mm, 0.5 mm, 0.4 mm, 0.3 mm, 0.2 mm, or 0.1 mm.

The serrations or serrated ribs may have an average base length of from about 0.05 mm to about 1 mm. For example, the average base length can be greater than or equal to about 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to about 1.0 mm, 0.9 mm, 0.8 mm, 0.7 mm, 0.6 mm, 0.5 mm, 0.4 mm, 0.3 mm, 0.2 mm, or 0.1 mm.

If serrations or serrated ribs are present, they may have an average height of from about 0.05 mm to about 4 mm. For example, the average height can be greater than or equal to about 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to about 1.0 mm, 0.9 mm, 0.8 mm, 0.7 mm, 0.6 mm, 0.5 mm, 0.4 mm, 0.3 mm, 0.2 mm, or 0.1 mm. For embodiments in which the serration height is the same as the rib height, the serrated ribs may also be referred to as protrusions. Such ranges may apply to separators for industrial traction-type start/stop batteries, where the total thickness of the separator may typically be about 1 mm to about 4 mm, as well as automotive start/stop batteries, where the total thickness of the separator may be a little less (e.g., typically about 0.3 mm to about 1 mm).

The serrations or serrated ribs may have an average center-to-center pitch within a column in the machine direction of from about 0.1 mm to about 50 mm. For example, the average center-to-center pitch can be greater than or equal to about 0.2 mm, 0.3 mm, 0.4 mm, 0.5 mm, 0.6 mm, 0.7 mm, 0.8 mm, 0.9 mm, 1.0 mm, 1.25 mm, or 1.5 mm; and/or less than or equal to about 1.5 mm, 1.25 mm, 1.0 mm, 0.9 mm, 0.8 mm, 0.7 mm, 0.6 mm, 0.5 mm, 0.4 mm, 0.3 mm, or 0.2 mm. In addition, adjacent columns of serrations or serrated ribs may be identically disposed at the same position in a machine direction or offset. In an offset configuration, adjacent serrations or serrated ribs are disposed at different positions in the machine direction. FIG. 3A shows serrated ribs disposed in an offset configuration.

The serrations or serrated ribs can have an average height to base width ratio of from about 0.1:1 to about 500:1. For example, the average height to base width ratio can be greater than or equal to about 0.1:1, 25:1, 50:1, 100:1, 150:1, 200:1, 250:1, 300:1, 350:1, or 450:1; and/or less than or equal to about 500:1, 450:1, 400:1, 350:1, 300:1, 250:1, 200:1, 150:1, 100:1, 50:1, or 25:1.

The serrations or serrated ribs can have average base width to tip width ratio of from about 1000:1 to about 0.1:1. For example, the average base width to tip width ratio can be greater than or equal to about 0.1:1, 1:1, 2:1, 3:1, 4:1, 5:1, 6:1, 7:1, 8:1, 9:1, 10:1, 15:1, 20:1, 25:1, 50:1, 100:1, 150:1, 200:1, 250:1, 300:1, 350:1, 450:1, 500:1, 550:1, 600:1, 650:1, 700:1, 750:1, 800:1, 850:1, 900:1, 950:1, and/or less than or equal to about 1000:1, 950:1, 900:1, 850:1, 800:1, 750:1, 700:1, 650:1, 600:1, 550:1, 500:1, 450:1, 400:1, 350:1, 300:1, 250:1, 200:1, 150:1, 100:1, 50:1, 25:1, 20:1, 15:1, 10:1, 9:1, 8:1, 7:1, 6:1, 5:1, 4:1, 3:1, 2:1, or 1:1.

In some embodiments, the separator can feature a combination of ribs, serrations or serrated ribs, dimples, or combinations thereof. For instance, a separator can have a series of serrated ribs running top to bottom along the separator, and a second series of serrated ribs running horizontally along the separator. In other embodiments, the separator can have an alternating sequence of serrated ribs, dimples, continuous, interrupted, or broken solid ribs, or combinations thereof.

In some selected embodiments, the porous separator can have negative longitudinal or cross-ribs on the opposite face of the membrane as the protrusions. The negative or back rib can be parallel to the top edge of the separator, or can be disposed at an angle thereto. For instance, the cross-ribs can be oriented about 90°, 80°, 75°, 60°, 50°, 45°, 35°, 25°, 15° or 5° relative to the top edge. The cross-ribs can be oriented about 90°-60°, 60°-30°, 60°-45°, 45°-30°, or 30°-0° relative to the top edge. Typically the cross-ribs are on the face of the membrane facing the negative electrode. In some embodiments of the present invention, the ribbed membrane can have a transverse cross-rib height Height$_{Neg}$ of at least about 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, or 1.0 mm. In some embodiments of the present invention, the ribbed membrane can have a transverse cross-rib height of no greater than about 1.0 mm, 0.5 mm, 0.25 mm, 0.20 mm, 0.15 mm, 0.10 mm or 0.05 mm.

In some embodiments of the present invention, the ribbed membrane can have a transverse cross-rib width of at least about 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, or 1.0 mm. In some embodiments of the present invention, the ribbed membrane can have a transverse cross-rib width of no greater than about 1.0 mm, 0.5 mm, 0.25 mm, 0.20 mm, 0.15 mm, 0.10 mm or 0.05 mm.

In certain selected embodiments the porous membrane can have a transverse cross-rib height of about 0.10-0.15 mm, and a longitudinal rib height of about 0.10-0.15 mm. In some embodiments, the porous membrane can have a transverse cross-rib height of about 0.10-0.125 mm, and a longitudinal rib height of about 0.10-0.125 mm.

Thickness

In certain select embodiments, an exemplary microporous membrane can have a backweb thickness Thickness$_{Backweb}$ that may be at least 50 µm, 0.1 mm, 0.2 mm, 0.3 mm, 0.4 mm, 0.5 mm 0.6 mm, 0.7 mm, 0.8 mm, 0.9 mm or 1.0 mm. The ribbed separator can have a backweb thickness that is no more than about 1.0 mm, 0.9 mm, 0.8 mm, 0.7 mm, 0.6 mm, 0.5 mm, 0.4 mm, 0.3 mm, 0.2 mm, 0.1 mm, or 50 µm. In some embodiments, the microporous membrane can have a backweb thickness between about 0.050-1.0 mm, 0.050-0.8 mm, 0.050-0.5 mm, 0.050-0.4 mm, or 0.050-0.3 mm. In some embodiments, the microporous membrane can have a backweb thickness of about 125 µm or 200 µm.

In certain select embodiments, an exemplary separator may have an overall thickness Thickness$_{Overall}$ that may be at least approximately 100 μm, 200 μm, 300 μm, 400 μm, 500 μm or greater, and up to about 1.0 mm to about 2.0 mm or greater.

Basis Weight

In certain selected embodiments, exemplary separators may be characterized with a basis weight (also referred to as area weight) measured in units of g/m2. Exemplary separators may exhibit a decreased basis weight. For instance, exemplary separators may have a basis weight of less than or equal to 140 g/m$^2$, less than or equal to 130 g/m$^2$, less than or equal to 120 g/m$^2$, less than or equal to 110 g/m$^2$, less than or equal to 100 g/m$^2$, less than or equal to 90 g/m$^2$, or lower. Exemplary separators preferably have a basis weight of approximately 130 g/m$^2$ to approximately 90 g/m$^2$ or lower, and preferably approximately 120 g/m$^2$ to approximately 90 g/m$^2$ or lower.

The basis weight is measured simply by weighing a sample, then dividing that value by the area of that sample. For example, one would take a 1.0 m by 1.0 m sample and weigh it. The area is calculated without regard to any ribs, groves, embossments, etc. As an example, a 1.0 m by 1.0 m sample of a ribbed separator would have the same area as a 1.0 m by 1.0 m sample of a flat separator.

Envelope

The separator 100 may be provided as a flat sheet, a leaf or leaves, a wrap, a sleeve, or as an envelope or pocket separator. An exemplary envelope separator may envelope a positive electrode ("positive enveloping separator"), such that the separator has two interior sides facing the positive electrode and two exterior sides facing adjacent negative electrodes. Alternatively, another exemplary envelope separator may envelope a negative electrode ("negative enveloping separator"), such that the separator has two interior sides facing the negative electrode and two exterior sides facing adjacent positive electrodes. In such enveloped separators, the bottom edge 103 may be a folded or a sealed crease edge. Further, the lateral edges 105a, 105b may be continuously or intermittently sealed seam edges. The edges may be bonded or sealed by adhesive, heat, ultrasonic welding, and/or the like, or any combination thereof.

Figure 4C:
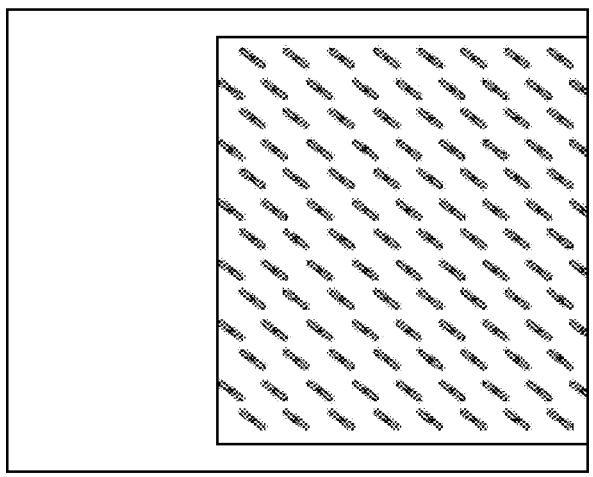
FIGS. 4A through 4C depict different embodiments of separators with exemplary rib profiles.
Figure 4B:
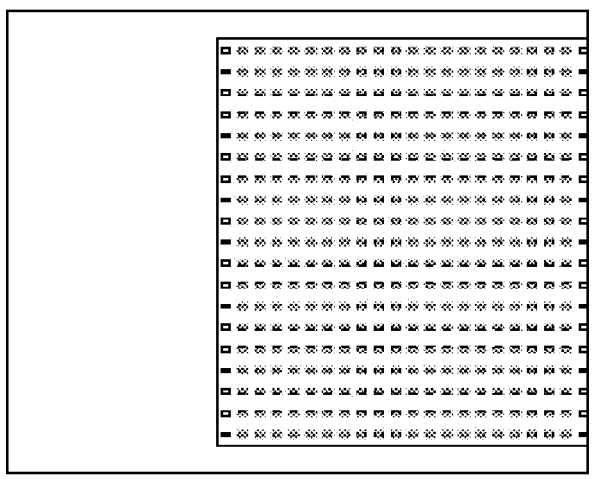
Figure 4A:
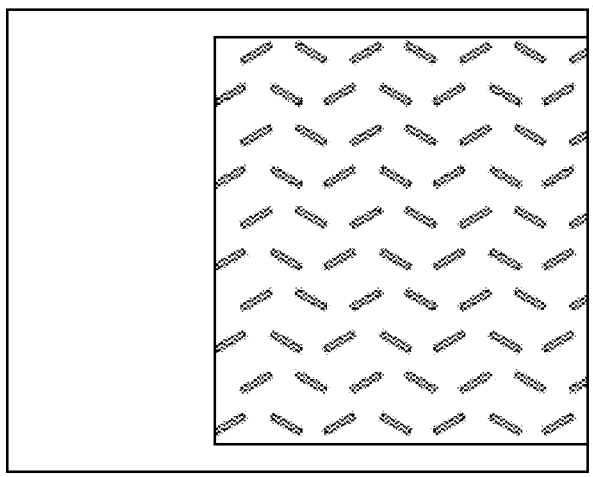

Some other exemplary embodiments of separator assembly configurations include: the ribs 104 facing a positive electrode; the ribs 104 facing a negative electrode; a negative or positive electrode envelope; a negative or positive electrode sleeve, a negative or positive electrode hybrid envelope; both electrodes may be enveloped or sleeved, and any combination thereof. For example, FIGS. 4A-4C depict several embodiments of ribbed separators (such as pieces, sleeves, envelopes, or pockets) with different rib profiles. It may be preferred that the shown ribs are positive ribs of a negative plate envelope (the negative plate is inside the envelope). The angled rib pattern of FIG. 4A may be a possibly preferred Daramic® RipTide™ acid mixing rib profile that can help reduce or eliminate acid stratification in certain batteries. The FIG. 4B profile may be a longitudinal serrated rib pattern. The FIG. 4C profile may be a diagonal offset rib pattern. The negative face could have no ribs (smooth), the same ribs, smaller ribs, longitudinal mini-ribs, cross mini-ribs or NCRs, diagonal ribs, or combinations thereof.

Certain exemplary separators may be processed to form hybrid Envelopes. The Hybrid Envelope May be Provided by Forming One or More Slits or Openings Before, During or after, Folding the Separator Sheet in Half and Bonding Edges of the Separator Sheet Together so as to Form an Envelope. The Length of the Openings can be at Least 1/50, 1/25, 1/20, 1/15, 1/10, 1/8, 1/5, 1/4, or 1/3 the Length of the Entire Edge. The Length of the Openings can be 1/50 to 1/3, 1/25 to 1/3, 1/20 to 1/3, 1/20 to 1/4, 1/15 to 1/4, 1/15 to 1/5 or 1/10 to 1/5 the Length of the Entire Edge. The hybrid envelope can have 1-5, 1-4, 2-4, 2-3 or 2 openings, which may or may not be equally disposed along the length of the bottom edge. It is preferred that no opening is in the corner of the envelope. The slits may be cut after the separator has been folded and sealed to give an envelope, or the slits may be formed prior to shaping the porous membrane into the envelope.

Combined with a Fibrous Mat

In certain embodiments, an exemplary porous membrane may further be laminated to another layer, such as a fibrous mat having enhanced wicking properties and/or enhanced wetting or holding of electrolyte properties. The fibrous mat may be woven, nonwoven, glass, or synthetic, single layered, multi-layered (where each layer may have the same, similar or different characteristics than the other layers), or any combination thereof.

When the fibrous layer is present, it is preferred that the microporous membrane has a larger surface area than the fibrous layers. Thus, when combining the microporous membrane and the fibrous layers, the fibrous layers do not completely cover the microporous layer. It is preferred that at least two opposing edge regions of the membrane layer remain uncovered to provide edges for heat sealing which facilitates the optional formation of pockets or envelopes. Such a fibrous mat may have a thickness that is at least 100 μm, in some embodiments, at least about 200 μm, at least about 250 μm, at least about 300 μm, at least about 400 μm, at least about 500 μm, at least about 600 μm, at least about 700 μm, at least about 800 μm, at least about 900 μm, at least about 1 mm, at least about 2 mm, and so forth. The subsequent laminated separator may be cut into pieces. In certain embodiments, the fibrous mat is laminated to a ribbed surface of the microporous membrane porous membrane. In certain embodiments, handling and/or assembly advantages are provided to the battery maker with the improved separator described herein, as it can be supplied in roll form and/or cut piece form. And as mentioned previously, the improved separator may be a standalone separator sheet or layer without the addition of one or more fibrous mats or the like.

Composition

The porous membrane may be made of: a natural or synthetic base material; a processing plasticizer; and a filler; and optionally, other additives and/or coatings, and/or the like.

Base Materials

In certain embodiments, exemplary natural or synthetic base materials may include: polymers; thermoplastic polymers; phenolic resins; natural or synthetic rubbers; synthetic wood pulp; glass fibers; synthetic fibers; cellulosic fibers; and any combination thereof. In certain preferable embodiments, an exemplary separator may be a microporous membrane made from thermoplastic polymers. Exemplary thermoplastic polymers may, in principle, include all acid-resistant thermoplastic materials suitable for use in lead acid batteries. In certain preferred embodiments, exemplary thermoplastic polymers may include polyvinyls and polyolefins. In certain embodiments, the polyvinyls may include, for example, polyvinyl chloride ("PVC"). In certain preferred embodiments, the polyolefins may include, for example, polyethylene, polypropylene, ethylene-butene copolymer, and any combination thereof, but preferably polyethylene. In certain embodiments, exemplary natural or synthetic rubbers may include, for example, latex, uncross-linked or cross-linked rubbers, crumb or ground rubber, and any combination thereof.

In certain embodiments, the porous membrane layer preferably includes a polyolefin, specifically polyethylene. Preferably, the polyethylene is high molecular weight polyethylene ("HMWPE"), (e.g., polyethylene having a molecular weight of at least 600,000). Even more preferably, the polyethylene is ultra-high molecular weight polyethylene ("UHMWPE") (e.g., polyethylene having a molecular weight of at least 1,000,000, in particular more than 4,000,000, and most preferably 5,000,000 to 8,000,000 as measured by viscosimetry and calculated by Margolie's equation), a standard load melt index of substantially zero (0) (measured as specified in ASTM D 1238 (Condition E) using a standard load of 2,160 g) and a viscosity number of not less than 600 ml/g, preferably not less than 1,000 ml/g, more preferably not less than 2,000 ml/g, and most preferably not less than 3,000 ml/g (determined in a solution of 0.02 g of polyolefin in 100 g of decalin at 130° C.).

Plasticizer

In certain embodiments, exemplary processing plasticizers may include processing oil, petroleum oil, paraffin-based mineral oil, mineral oil, and any combination thereof.

In some embodiments, the separator has a total residual or final oil content in a range of about 0.5% by weight to about 40% by weight, in some embodiments, about 10% to about 30% residual processing oil, and in some instances, about 20 to about 30% residual processing oil or residual oil, per the weight of the separator sheet product. In some exemplary embodiments, the porous membrane alone may have a residual oil content from about less than or equal to about 10%, while the separator (porous membrane and ribs) may have a residual oil content from about less than or equal to about 20%

Fillers

In certain embodiments, exemplary fillers may include: dry finely divided silica; precipitated silica; amorphous silica; alumina; talc; fish meal, fish bone meal, and the like, and any combination thereof. In certain preferred embodiments, the filler is one or more silicas, fumed silicas, precipitated silicas, friable silicas, dispersable silicas, and/or the like. Silica with relatively high levels of oil absorption and relatively high levels of affinity for the plasticizer (e.g., mineral oil) becomes desirably dispersible in the mixture of the polyolefin base material (e.g., polyethylene) and mineral oil when forming a lead acid battery separator of the type shown herein. In some selected embodiments, the filler has an average particle size no greater than 25 µm, in some instances, no greater than 22 µm, 20 µm, 18 µm, 15 µm, or 10 µm. In some instances, the average particle size of silica filler particles is 15 µm-25 µm. The particle size of the silica filler and/or the surface area of the silica filler contributes to the oil absorption. Silica particles in the final product or separator may fall within the sizes described above. However, the initial silica used as raw material may come as one or more agglomerates and/or aggregates and may have sizes around 200 µm or more.

The fillers may further reduce what is called the hydration sphere of the electrolyte ions, enhancing their transport across the membrane, thereby once again lowering the overall electrical resistance or ER of the battery, such as an enhanced flooded battery or system.

The filler or fillers may contain various species (e.g., polar species, such as metals) that facilitate the flow of electrolyte and ions across the separator. Such also leads to decreased overall electrical resistance as such a separator is used in a flooded battery, such as an enhanced flooded battery.

Additives/Surfactants

In certain embodiments, exemplary separators may contain one or more performance enhancing additives added to the separator or porous membrane. The performance enhancing additive may be surfactants, wetting agents, colorants, antistatic additives, an antimony suppressing additive, UV-protection additives, antioxidants, and/or the like, and any combination thereof. In certain embodiments, the additive surfactants may be ionic, cationic, anionic, or non-ionic surfactants.

In certain embodiments described herein, a reduced amount of anionic or non-ionic surfactant is added to the inventive porous membrane or separator. Because of the lower amount of surfactant, a desirable feature may include lowered total organic carbons ("TOCs") and/or lowered volatile organic compounds ("VOCs").

Certain suitable surfactants are non-ionic while other suitable surfactants are anionic. The additive may be a single surfactant or a mixture of two or more surfactants, for instance two or more anionic surfactants, two or more non-ionic surfactants, or at least one ionic surfactant and at least one non-ionic surfactant. Certain suitable surfactants may have HLB values less than 6, preferably less than 3. The use of these certain suitable surfactants in conjunction with the inventive separators described herein can lead to even further improved separators that, when used in a lead acid battery, lead to reduced water loss, reduced antimony poisoning, improved cycling, reduced float current, reduced float potential, and/or the like, or any combination thereof for that lead acid batteries. Suitable surfactants include surfactants such as salts of alkyl sulfates; alkylarylsulfonate salts; alkylphenol-alkylene oxide addition products; soaps; alkyl-naphthalene-sulfonate salts; one or more sulfo-succinates, such as an anionic sulfo-succinate; dialkyl esters of sulfo-succinate salts; amino compounds (primary, secondary, tertiary amines, or quaternary amines); block copolymers of ethylene oxide and propylene oxide; various polyethylene oxides; and salts of mono and dialkyl phosphate esters. The additive can include a non-ionic surfactant such as polyol fatty acid esters, polyethoxylated esters, polyethoxylated alcohols, alkyl polysaccharides such as alkyl polyglycosides and blends thereof, amine ethoxylates, sorbitan fatty acid ester ethoxylates, organosilicone based surfactants, ethylene vinyl acetate terpolymers, ethoxylated alkyl aryl phosphate esters and sucrose esters of fatty acids.

In certain embodiments, the additive may be represented by a compound of Formula (I)

$$R(OR^1)_n(COOM_{1/x}{}^{x+})_m \qquad (I)$$

in which:

R is a linear or non-aromatic hydrocarbon radical with 10 to 4200 carbon atoms, preferably 13 to 4200, which may be interrupted by oxygen atoms;

$R^1$=H, $-(CH_2)_k COOM_{1/x}{}^{x+}$, or $-(CH_2)_k-SO_3M_{1/x}{}^{x+}$, preferably H, where k=1 or 2;

M is an alkali metal or alkaline-earth metal ion, $H^+$ or $NH_4^+$, where not all the variables M simultaneously have the meaning $H^+$;

n=0 or 1;

m=0 or an integer from 10 to 200; and x=1 or 2.

The ratio of oxygen atoms to carbon atoms in the compound according to Formula (I) being in the range from 1:1.5 to 1:30 and m and n not being able to simultaneously be 0. However, preferably only one of the variables n and m is different from 0.

By non-aromatic hydrocarbon radicals is meant radicals which contain no aromatic groups or which themselves represent one. The hydrocarbon radicals may be interrupted by oxygen atoms (i.e., contain one or more ether groups).

R is preferably a straight-chain or branched aliphatic hydrocarbon radical which may be interrupted by oxygen atoms. Saturated, uncross-linked hydrocarbon radicals are quite particularly preferred. However, as noted above, R may, in certain embodiments, be aromatic ring-containing.

Through the use of the compounds of Formula (I) for the production of battery separators, they may be effectively protected against oxidative destruction.

Battery separators are preferred which contain a compound according to Formula (I) in which:

R is a hydrocarbon radical with 10 to 180, preferably 12 to 75 and quite particularly preferably 14 to 40 carbon atoms, which may be interrupted by 1 to 60, preferably 1 to 20 and quite particularly preferably 1 to 8 oxygen atoms, particularly preferably a hydrocarbon radical of formula $R^2$—$[(OC_2H_4)_p(OC_3H_6)_q]$—, in which:

$R^2$ is an alkyl radical with 10 to 30 carbon atoms, preferably 12 to 25, particularly preferably 14 to 20 carbon atoms, wherein $R^2$ can be linear or non-linear such as containing an aromatic ring;

P is an integer from 0 to 30, preferably 0 to 10, particularly preferably 0 to 4; and q is an integer from 0 to 30, preferably 0 to 10, particularly preferably 0 to 4;

compounds being particularly preferred in which the sum of p and q is 0 to 10, in particular 0 to 4;

n=1; and m=0.

Formula $R^2$—$[(OC_2H_4)_p(OC_3H_6)_q]$— is to be understood as also including those compounds in which the sequence of the groups in square brackets differs from that shown. For example according to the invention compounds are suitable in which the radical in brackets is formed by alternating $(OC_2H_4)$ and $(OC_3H_6)$ groups.

Additives in which $R^2$ is a straight-chain or branched alkyl radical with 10 to 20, preferably 14 to 18 carbon atoms have proved to be particularly advantageous. $OC_2H_4$ preferably stands for $OCH_2CH_2$, $OC_3H_6$ for $OCH(CH_3)_2$ and/or $OCH_2CH_2CH_3$.

As preferred additives there may be mentioned in particular alcohols (p=q=0; m=0) primary alcohols being particularly preferred, fatty alcohol ethoxylates (p=1 to 4, q=0), fatty alcohol propoxylates (p=0; q=1 to 4) and fatty alcohol alkoxylates (p=1 to 2; q=1 to 4) ethoxylates of primary alcohols being preferred. The fatty alcohol alkoxylates are for example accessible through reaction of the corresponding alcohols with ethylene oxide or propylene oxide.

Additives of the type m=0 which are not, or only difficulty, soluble in water and sulphuric acid have proved to be particularly advantageous.

Also preferred are additives which contain a compound according to Formula (I), in which:

R is an alkane radical with 20 to 4200, preferably 50 to 750 and quite particularly preferably 80 to 225 carbon atoms;

M is an alkali metal or alkaline-earth metal ion, $H^+$ or $NH_4^+$, in particular an alkali metal ion such as $Li^+$, $Na^+$ and $K^+$ or $H^+$, where not all the variables M simultaneously have the meaning $H^+$;

n=0;

m is an integer from 10 to 200; and x=1 or 2.

Salt Additives

In certain embodiments, suitable additives may include, in particular, polyacrylic acids, polymethacrylic acids and acrylic acid-methacrylic acid copolymers, whose acid groups are at least partly neutralized, such as by preferably 40%, and particularly preferably by 80%. The percentage refers to the number of acid groups. Quite particularly preferred are poly(meth)acrylic acids which are present entirely in the salt form. Suitable salts include Li, Na, K, Rb, Be, Mg, Ca, Sr, Zn, and ammonium (NR4, wherein R is either hydrogen or a carbon functional group). Poly(meth)acrylic acids may include polyacrylic acids, polymethacrylic acids, and acrylic acid-methacrylic acid copolymers. Poly (meth)acrylic acids are preferred and in particular polyacrylic acids with an average molar mass Mw of 1,000 to 100,000 g/mol, particularly preferably 1,000 to 15,000 g/mol and quite particularly preferably 1,000 to 4,000 g/mol. The molecular weight of the poly(meth)acrylic acid polymers and copolymers is ascertained by measuring the viscosity of a 1% aqueous solution, neutralized with sodium hydroxide solution, of the polymer (Fikentscher's constant).

Also suitable are copolymers of (meth)acrylic acid, in particular copolymers which, besides (meth)acrylic acid contain ethylene, maleic acid, methyl acrylate, ethyl acrylate, butyl acrylate and/or ethylhexyl acrylate as comonomer. Copolymers are preferred which contain at least 40% by weight and preferably at least 80% by weight (meth) acrylic acid monomer; the percentages being based on the acid form of the monomers or polymers.

To neutralize the polyacrylic acid polymers and copolymers, alkali metal and alkaline-earth metal hydroxides such as potassium hydroxide and in particular sodium hydroxide are particularly suitable. In addition, a coating and/or additive to enhance the separator may include, for example, a metal alkoxide, wherein the metal may be, by way of example only (not intended to be limiting), Zn, Na, or Al, by way of example only, sodium ethoxide.

In some embodiments, the microporous polyolefin porous membrane may include a coating on one or both sides of such layer. Such a coating may include a surfactant or other material. In some embodiments, the coating may include one or more materials described, for example, in U.S. Patent Publication No. 2012/0094183, which is incorporated by reference herein. Such a coating may, for example, reduce the overcharge voltage of the battery system, thereby extending battery life with less grid corrosion and preventing dry out and/or water loss.

Ratios

In certain selected embodiments, the membrane may be prepared by combining, by weight, about 5-15% polymer, in some instances, about 10% polymer, about 10-75% filler, in some instances, about 30% filler, and about 10-85% processing oil, in some instances, about 60% processing oil. In other embodiments, the filler content is reduced, and the oil content is higher, for instance, greater than about 61%, 62%, 63%, 64%, 65%, 66%, 67%, 68%, 69% or 70% by weight. The filler:polymer ratio (by weight) can be about (or can be between about these specific ranges) such as 2:1, 2.5:1, 3:1, 3.5:1, 4.0:1. 4.5:1, 5.0:1, 5.5:1 or 6:1. The filler:polymer ratio (by weight) can be from about 1.5:1 to about 6:1, in some instances, 2:1 to 6:1, from about 2:1 to 5:1, from about 2:1 to 4:1, and in some instances, from about 2:1 to about 3:1. The amounts of the filler, the oil, the polymer (e.g., polyethylene) are all balanced for runnability and desirable separator properties, such as electrical resistance, basis weight, puncture resistance, bending stiffness, oxidation resistance, porosity, physical strength, tortuosity, and the like.

In accordance with at least one embodiment, the porous membrane can include an UHMWPE mixed with a processing oil and precipitated silica. In accordance with at least one embodiment, the microporous membrane can include an UHMWPE mixed with a processing oil, additive and precipitated silica. The mixture may also include minor amounts of other additives or agents as is common in the separator arts (e.g., surfactants, wetting agents, colorants, antistatic additives, antioxidants, and/or the like, and any combination thereof). In certain instances, the microporous polymer layer can be a homogeneous mixture of 8 to 100% by volume of polyolefin, 0 to 40% by volume of a plasticizer and 0 to 92% by volume of inert filler material. The preferred plasticizer is petroleum oil. Since the plasticizer is the component which is easiest to remove from the polymer-filler-plasticizer composition, it is useful in imparting porosity to the battery separator.

A microporous membrane made in accordance with the present invention, comprising polyethylene and filler (e.g., silica) typically has a residual oil content; in some embodiments, such residual oil content is from about 0.5% up to about 40% of the total weight of the separator membrane (in some instances, about 10-40% of the total weight of the separator membrane, and in some instances, about 20-40% of that total weight). In certain selected embodiments herein, some to all of the residual oil content in the separator may be replaced by the addition of more of a performance enhancing additive, such as a surfactant, such as a surfactant with a hydrophilic-lipophilic balance ("HLB") less than 6, or such as a nonionic surfactant. For example, a performance enhancing additive such as a surfactant, such as a nonionic surfactant, may comprise up to 0.5% all the way up to all of the amount of the residual oil content (e.g., all the way up to 20% or 30% or even 40%) of the total weight of the microporous separator membrane, thereby partially or completely replacing the residual oil in the separator membrane.

Manufacture

In some embodiments, an exemplary porous membrane may be made by mixing the constituent parts in an extruder. For example, about 30% by weight silica with about 10% by weight UHMWPE, and about 60% processing oil may be mixed in an extruder. The exemplary microporous membrane may be made by passing the constituent parts through a heated extruder, passing the extrudate generated by the extruder through a die and into a nip formed by two heated presses or calender stack or rolls to form a continuous web. The calender rolls also establish a baseweb thickness TBASE and/or backweb thickness TBACK. A substantial amount of the processing oil from the web may be extracted by use of a solvent. The web may then be dried and slit into lanes of predetermined width, and then wound onto rolls. Alternatively or additionally, the presses or calender rolls may be engraved with various groove patterns to impart ribs, grooves, textured areas, serrations, serrated ribs, battlement or battlemented ribs, broken ribs, angled ribs, linear ribs, or curved or sinusoidal ribs, embossments, dimples, and/or the like extending in to or from the microporous membrane, or any combination thereof into the separator.

Manufacture with Surfactant

In certain embodiments, optional additives or agents (e.g., surfactants, wetting agents, colorants, antistatic additives, antioxidants, and/or the like, and any combination thereof) may also be mixed together with the other constituent parts within the extruder. A microporous membrane according to the present disclosure may then be extruded into the shape of a sheet or web, and finished in substantially the same way as described above.

In certain embodiments, and in addition or alternative to adding into the extruder, the additive or additives may, for example, be applied to the separator porous membrane when it is finished (e.g., after extracting a bulk of the processing oil). According to certain preferred embodiments, the additive or a solution (e.g., an aqueous solution) of the additive is applied to one or more surfaces of the separator. This variant is suitable in particular for the application of non-thermostable additives and additives which are soluble in the solvent used for the extraction of processing oil. Particularly suitable as solvents for the additives according to the invention are low-molecular-weight alcohols, such as methanol and ethanol, as well as mixtures of these alcohols with water. The application can take place on the side facing the negative electrode, the side facing the positive electrode, or on both sides of the separator. The application may also take place during the extraction of the pore forming agent (e.g., the processing oil) while in a solvent bath. In certain select embodiments, some portion of a performance enhancing additive, such as a surfactant coating or a performance enhancing additive added to the extruder before the separator is made (or both) may combine with the antimony in the battery system and may inactivate it and/or form a compound with it and/or cause it to drop down into the mud rest of the battery and/or prevent it from depositing onto the negative electrode.

In certain embodiments, the additive (e.g., a non-ionic surfactant, an anionic surfactant, or mixtures thereof) can be present at a density or add-on level of at least 0.5 $g/m^2$, 1.0 $g/m^2$, 1.5 $g/m^2$, 2.0 $g/m^2$, 2.5 $g/m^2$, 3.0 $g/m^2$, 3.5 $g/m^2$, 4.0 $g/m^2$, 4.5 $g/m^2$, 5.0 $g/m^2$, 5.5 $g/m^2$, 6.0 $g/m^2$, 6.5 $g/m^2$, 7.0 $g/m^2$, 7.5 $g/m^2$, 8.0 $g/m^2$, 8.5 $g/m^2$, 9.0 $g/m^2$, 9.5 $g/m^2$ or 10.0 $g/m^2$ or even up to about 20.0 $g/m^2$. The additive can be present on the separator at a density or add-on level between 0.5-15 $g/m^2$, 0.5-10 $g/m^2$, 1.0-10.0 $g/m^2$, 1.5-10.0 $g/m^2$, 2.0-10.0 $g/m^2$, 2.5-10.0 $g/m^2$, 3.0-10.0 $g/m^2$, 3.5-10.0 $g/m^2$, 4.0-10.0 $g/m^2$, 4.5-10.0 $g/m^2$, 5.0-10.0 $g/m^2$, 5.5-10.0 $g/m^2$, 6.0-10.0 $g/m^2$, 6.5-10.0 $g/m^2$, 7.0-10.0 $g/m^2$, 7.5-10.0 $g/m^2$, 4.5-7.5 $g/m^2$, 5.0-10.5 $g/m^2$, 5.0-11.0 $g/m^2$, 5.0-12.0 $g/m^2$, or 5.0-15.0 $g/m^2$.

The application may also take place by dipping the battery separator in the additive or a solution of the additive (solvent bath addition) and removing the solvent if necessary (e.g., by drying). In this way the application of the additive can be combined, for example, with the extraction often applied during membrane production. Other preferred methods are to spray the surface with additive, dip coat, roller coat, or curtain coat the one or more additives on the surface of separator.

In certain embodiments described herein, a reduced amount of anionic or non-ionic surfactant is added to the inventive separator. In such instances, a desirable feature may include lowered total organic carbons and/or lowered volatile organic compounds (because of the lower amount of surfactant) may produce a desirable inventive separator according to such embodiment.

Manufacture/Thickness

As stated, the press or calender may be engraved to impart ribs, grooves, textured areas, serrations, serrated ribs, battlement or battlemented ribs, broken ribs, angled ribs, linear ribs, or curved or sinusoidal ribs, embossments, dimples, and/or the like extending in to or from the microporous membrane, or any combination thereof.

In some embodiments, the porous separator membrane can have a backweb thickness Thickness$_{Backweb}$ from about 50 µm-1.0 mm, and at least about 50 µm, at least about 75 µm, at least about 100 µm, at least about 125 µm, at least about 150 µm, at least about 175 µm, at least about 200 µm, at least about 225 µm, at least about 250 µm, at least about 275 µm, at least about 300 µm, at least about 325 µm at least about 350 µm, at least about 375 µm, at least about 400 µm, at least about 425 µm, at least about 450 µm, at least about 475 µm, or at least about 500 µm (though in certain embodiments, a very thin flat backweb thickness Thickness$_{Backweb}$ of 50 µm is provided, for example, between 50 µm and 75 µm thick). In certain embodiments, the backweb thickness Thickness$_{Backweb}$ may be less than or equal to about 125 µm±75 µm.

In certain embodiments, the porous membrane can have a baseweb thickness TBASE from about 50 µm-1.0 mm, about 50 µm-750 µm, about 100 µm-750 µm, about 200 µm-750 µm, about 200 µm-500 µm, about 150 µm-500 µm, about 250 µm-500 µm, about 250 µm-400 µm, or about 250 µm-350 µm. In certain embodiments, the baseweb thickness TBASE may be less than or equal to about 200 µm±35 µm.

Puncture Resistance

In certain selected embodiments, exemplary separators may be characterized with an increased puncture resistance. For instance a puncture resistance of approximately 9 N or higher, 9.5 N or higher, 10 N or higher, 10.5 N or higher, 11 N or higher, 11.5 N or higher 12 N or higher, 12.5 N or higher, 13 N or higher, 13.5 N or higher, 14 N or higher, 14.5 N or higher, 15 N or higher, 15.5 N or higher, 16 N or higher, 16.5 N or higher, 17 N or higher, 17.5 N or higher, 18 N or higher, 18.5 N or higher, 19 N or higher, 19.5 N or higher, or 20 N or higher. In certain embodiments, exemplary separators may be preferably defined with an average puncture resistance of approximately 9 N-20 N or higher, or more preferably approximately 11 N-20 N or higher.

Figure 5:
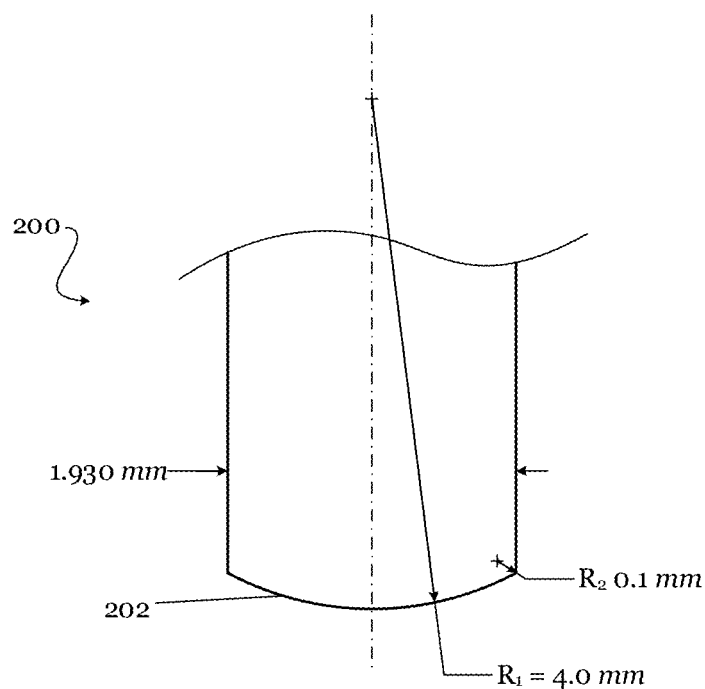
FIG. 5 illustrates a tip used to puncture test separators.

The puncture resistance may be measured as the force required to puncture the porous membrane utilizing the tip 200 as generally depicted in FIG. 5. The puncture base in which the porous membrane is supported while the tip 200 punctures the membrane may generally be described as a base having a 6.5 mm diameter straight hole with a 10 mm depth. The travel limit of the tip may be approximately 4 mm-8 mm below the puncture base surface. The puncture tip 200 is linearly moved into the membrane at a rate of approximately 5 mm/s.

Electrical Resistance

In certain selected embodiments, exemplary separators exhibit decreased electrical resistance. For instance, an electrical resistance no greater than about 200 mΩ·cm², 180 mΩ·cm², 160 mΩ·cm², 140 mΩ·cm², 120 mΩ·cm², 100 mΩ·cm², 80 mΩ·cm², 60 mΩ·cm², 50 mΩ·cm², 40 mΩ·cm², 30 mΩ·cm², or 20 mΩ·cm². In certain selected embodiments, exemplary separators may have a preferred electrical resistance of preferably 40 mΩ·cm²-25 mΩ·cm² or lower.

To test a sample separator for ER testing evaluation in accordance with the present invention, it must first be prepared. To do so, a sample separator is preferably submerged in a bath of demineralized water, the water is then brought to a boil and the separator is then removed after 10 minutes in the boiling demineralized water bath. After removal, excess water is shaken off the separator and then placed in a bath of sulfuric acid having a specific gravity of 1.280 at 27° C.±1° C. The separator is soaked in the sulfuric acid bath for 20 minutes. The separator is then ready to be tested for electrical resistance.

Bending Stiffness

In certain selected embodiments, exemplary separators may be characterized with an increased bending stiffness in the cross-machine direction. While not wishing to be bound by theory, it is believed that an increased bending stiffness in the cross-machine direction improves the separator's ability to be processed during the manufacturing of the lead acid battery.

For instance, an embodiment of a separator may have a bending stiffness of approximately 20 mN or higher, 21 mN or higher, 22 mN or higher, 23 mN or higher, 24 mN or higher, 25 mN or higher, 26 mN or higher, 27 mN or higher, 28 mN or higher, 29 mN or higher, 30 mN or higher, 31 mN or higher, 32 mN or higher, 33 mN or higher, 34 mN or higher, 35 mN or higher, 36 mN or higher, 37 mN or higher, 38 mN or higher, 39 mN or higher, 40 mN or higher, 41 mN or higher, 42 mN or higher, 43 mN or higher, 44 mN or higher, 45 mN or higher. In certain embodiments, exemplary separators may be defined with a puncture resistance of approximately 20 mN-40 mN or higher, or more preferably approximately 25 mN-45 mN or higher.

Figure 6:
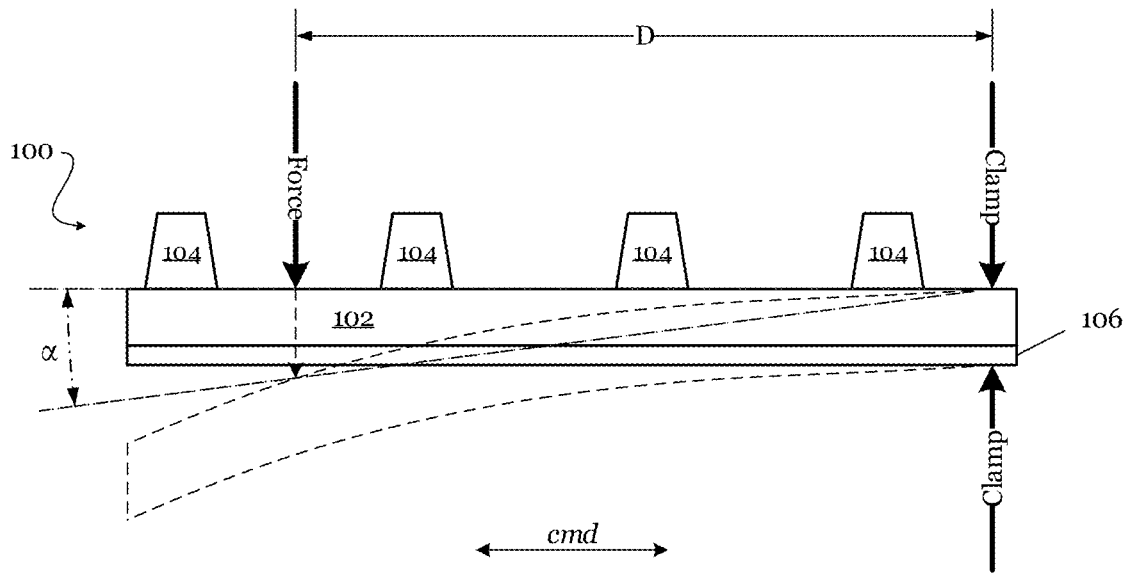
FIG. 6 is a schematic rendering of a bending test for separators.

The bending stiffness in the cross machine direction may be measured as the force required to bend a sample. FIG. 6 shows a test set up used to measure the bending stiffness. To measure this value, it may be preferable to cut a sample piece of the separator into a 150 mm by 10.0 mm rectangle. To perform the test, the 150 mm edge of the sample is clamped along the length. A force is applied at a bending length D of 5 mm. The bending stiffness is determined by the force required to bend the sample to a bending angle α of 30°. The bending angle α is determined by the plane that runs through the sample between the clamp and the application of the force, and the same plane at the end of the test.

Oxidation Stability

In certain selected embodiments, exemplary separators may be characterized with an improved and higher oxidation resistance. Oxidation resistance is measured in elongation of sample separator specimens in the cross-machine direction after prolonged exposure to the lead acid battery electrolyte. For instance, exemplary separators may have an elongation at 40 hours of approximately 100% or higher, 150% or higher, 200% or higher, 250% or higher, 300% or higher, 350% or higher, 400% or higher, 450% or higher, or 500% or higher. In certain embodiments, exemplary separators may have a preferred oxidation resistance or elongation at 40 hours of approximately 100% or higher. In addition, exemplary separators may have an elongation at 20 hours of approximately 200% or higher, 250% or higher, 300% or higher, 350% or higher, 400% or higher, 450% or higher, or 500% or higher. In certain embodiments, exemplary separators may have a preferred oxidation resistance or elongation at 20 hours of approximately 200% or higher.

Figure 7A:
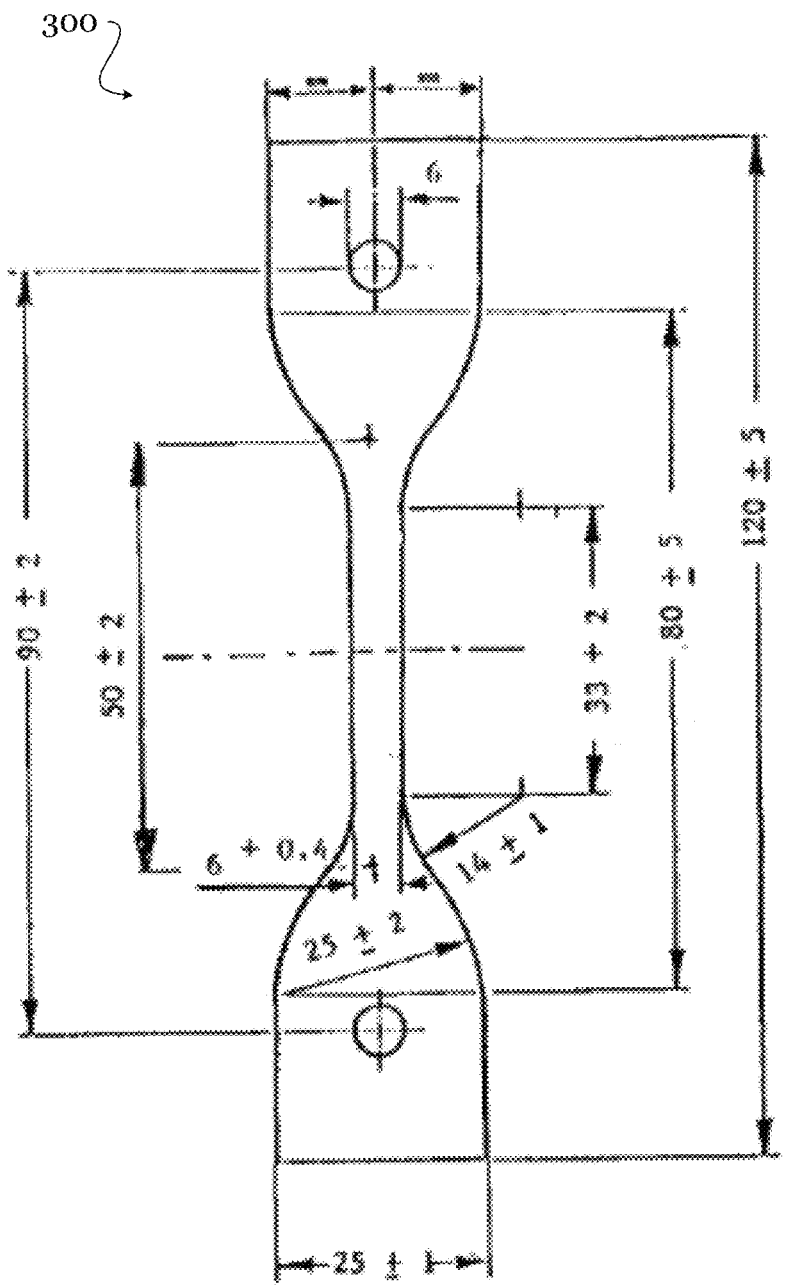
FIG. 7A is a schematic rendering of an elongation test sample
Figure 7B:
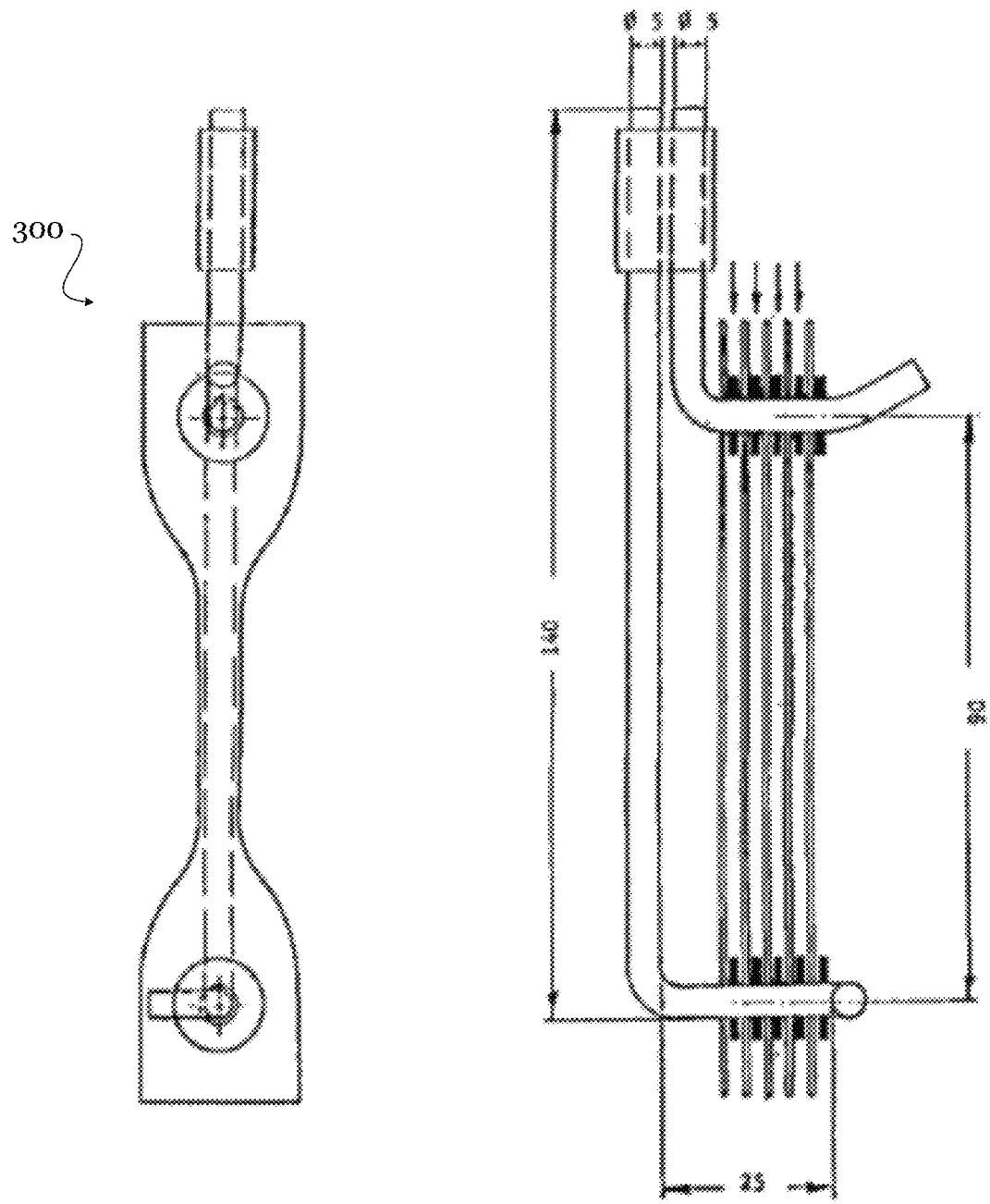
FIG. 7B illustrates a sample holder for an elongation test.

To test samples for oxidation resistance, sample specimens 400 of exemplary separators are first cut to a shape as generally set forth in FIG. 7A. The specimens 400 are then placed in a sample holder as generally shown in FIG. 7B.

A first sample set is tested dry, at time=0 hours, for elongation % to break. The elongation is based upon the 50 mm distance as measured from points A and B in FIG. 7A. For instance, if points A and B are stretched to a distance of 300%, then the final distance between A and B would be 150 mm.

The elongation test is designed to simulate extended exposure to electrolyte in a cycling battery in a shortened time period. The samples 400 are first fully submersed in isopropanol, drained and then submersed in water for 1 to 2 seconds. The samples are then submersed in an electrolyte solution. The solution is prepared by adding, in order, 360 ml of 1.28 specific gravity sulfuric acid, 35 ml of 1.84 specific gravity sulfuric acid, then 105 ml of 35% hydrogen peroxide. The solution is kept at 80° C. and the samples are submerged in the solution for an extended period. Samples may be tested for elongation at regular time intervals, such as 20 hours, 40 hours, 60 hours, 80 hours, etc. To test at these intervals, the samples 400 are remove from the 80° C. electrolyte bath and placed under luke-warm running water until the acid has been removed. The elongation can then be tested.

In accordance with at least selected embodiments, the present disclosure or invention is directed to improved battery separators, Low ER or high conductance separators, improved lead acid batteries, such as flooded lead acid batteries, high conductance batteries, and/or, improved vehicles including such batteries, and/or methods of manufacture or use of such separators or batteries, and/or combinations thereof. In accordance with at least certain embodiments, the present disclosure or invention is directed to improved lead acid batteries incorporating the improved separators and which exhibit increased conductance.

EXAMPLES

Table 1 details parameters for an exemplary inventive battery separator in accordance with the present disclosure.

TABLE 1

| Property | Value |
|---|---|
| Baseweb Thickness Thickness$_{Baseweb}$ (μm) | 200 ± 35 |
| Backweb Thickness Thickness$_{Backweb}$ (μm) | 125 ± 75 |
| NCR Height Height$_{Neg}$ (μm) | 50-75 |
| Puncture Resistance (N) | ≥12.5 |
| ER (mΩ · cm$^2$) | ≤40 |
| Elongation in CMD (%) | ≥200 |
| Bending Stiffness in CMD (mN) | ≥35 |
| Oxidation Resistance - 40 h (%) | ≥200 |
| Oxidation Resistance - 20 h (%) | ≥200 |
| Basis Weight (g/m$^2$) | ≤130 |
| Total Oil Content (%) | ≤20 |
| Backweb Oil Content (%) | ≥10 |
| Ash Content (%) | 67.0 ± 2.5 |
| Porosity in Water (%) | 64 ± 4 |

Table 2 represents parameters for exemplary inventive battery separators in accordance with the present disclosure. Improved separator #1 represents a first attempt in creating an inventive separator, and improved separator #2 represents an exemplary separator created from a refined process.

TABLE 2

| Property | Target Values | Improved Separator #1 (range (average)) | Improved Separator #2 (range (average)) |
|---|---|---|---|
| Basis Weight (g/m$^2$) | Approximately 130-90 or lower | 99.8 | 118.5-123.2 (120.7) |
| Puncture Resistance (N) | Approximately 11.0-20 or higher | 8.2-13.9 (11.43) | 10.9-16.4 (13.0) |
| Electrical Resistance (mΩ · cm$^2$) | Approximately 40-25 or lower | 33-34 (33.6) | 37-41 (39.3) |
| Bending Stiffness in CMD (mN) | Approximately 25-40 | 33.5 | 24-38 (30.4) |
| Oxidation Resistance - 40 h (%) | Approximately 100-350 | 80-116 (91) | 130-311 (218) |
| Baseweb Thickness $T_{BASE}$ (μm) | Approximately 200-350 | 215-221 (218.2) | 221-237 (228.2) |
| Elongation in CMD (%) | ≥200 | 324-398 (354) | 364-546 (481) |
| Total Oil Content (%) | ≤20 | 16.1 | 16.8-17.4 (17.1) |
| Ash Content (%) | Approximately 67.0 ± 2.5 | 64.5 | 64.1-64.3 (64.2) |
| Porosity in Water (%) | Approximately 64 ± 4 | 62.5-63.2 (62.9) | 61.0-60.8 (60.9) |

Table 3 details a comparison between exemplary improved separator #2, and control separator #1 and control separator #2, both of which are commercially available lead acid battery separators.

TABLE 3

| | Separator Average Values | | |
|---|---|---|---|
| Property | Control #1 | Control #2 | Improved Separator #2 |
| Basis Weight (g/m$^2$) | 130 | 124 | 120.7 |
| Puncture Resistance(N) | 12.5 | 12.7 | 13.0 |
| ER (mΩ · cm$^2$) | 38 | 46 | 39.3 |
| CMD Stiffness (mN) | 22 | 29 | 30.4 |
| Oxidation (%) | 323 @ 20 hours | 231 @ 20 hours | 218 @ 40 hours |

CONCLUSION

The improved separators are useful in a variety of batteries, particularly lead acid batteries, and lead acid battery applications. The battery can be a flooded battery, which may be a tubular or flat plate battery. The batteries can be used in motive applications such as golf cart (sometimes referred to as golf car) batteries, or other deep-cycling applications such as solar or wind power battery.

In addition, the inventive battery separators disclosed and described herein provide the improved deep cycle batteries in which they are used with a more consistent, and lower, end of charge (EOC) current. Maintaining lower EOC current reveals that the improved batteries described herein are exhibiting antimony poisoning suppression. By way of example, as a new deep cycle lead acid battery ages, more antimony is in the battery, meaning that the EOC current may increase over the life of the battery, thereby increasing the water consumption of the battery and thereby reducing the overall life cycle performance of the battery. The inventive separators described herein mean that the EOC current is maintained more consistently throughout the cycle life of the battery, thereby showing reduction in Sb poisoning.

Furthermore, the improved, battery separators described herein also provide a deep cycle flooded lead acid battery that exhibits a decreased float charge current at a steady state potential relative to batteries made using previously known separators; a reduction in the voltage and/or energy required to return the deep cycle operated battery to full charge, relative to a deep cycle battery made using a previously known separator; overall improved voltage control relative to a battery made using a previously known separator; and/or reduced grid corrosion relative to a battery made using a previously known separator.

In select embodiments of the present invention, a lead acid battery separator may be provided a basis weight of approximately 130 g/m² or less, and a bending stiffness in the cross-machine direction of greater than or equal to approximately 25 mN.

In certain other select embodiments of the present invention, a lead acid battery separator may be provided with a cross-machine direction stiffness of less than or equal to approximately 25 mN, and a backweb thickness less than or equal to approximately 125 µm.

In some aspects of the present invention, the separator may be provided with an electrical resistance of less than or equal to approximately 40 mΩ·cm²; an average puncture resistance of greater than or equal to approximately 11.0 N; an oxidation resistance at 20 hours of greater than or equal to approximately 200%; an oxidation resistance at 40 hours of greater than or equal to approximately 100%; a backweb thickness of less than or equal to approximately 125 µm; a residual oil content of less than or equal to about 20%; a porous membrane having a residual oil content of greater than or equal to about 10%.

In other aspects of the present invention, the lead acid battery separator may have at least one array of ribs, wherein the at least one array of ribs are at least one from the group consisting of: solid ribs, broken ribs, discrete broken ribs, continuous ribs, discontinuous ribs, angled ribs, linear ribs, longitudinal ribs extending substantially in a machine direction of the porous membrane, lateral ribs extending substantially in a cross-machine direction of the porous membrane, transverse ribs extending substantially in a cross-machine direction of the porous membrane, cross ribs extending substantially in a cross-machine direction of the porous membrane, serrations, serrated ribs, battlements or battlemented ribs, curved or sinusoidal ribs, disposed in a solid or broken zig-zag-like fashion, grooves, channels, textured areas, embossments, dimples, porous, non-porous, mini ribs or cross-mini ribs, and combinations thereof.

In select embodiments, the separator may have a first array of ribs extending from a first backweb surface, and having a first rib height as measured from the first backweb surface; a second array of ribs extending from the second backweb surface and being substantially orthogonal to the first array of ribs, and having a second rib height as measured from the second backweb surface; and a baseweb thickness of less than or equal to approximately 200 µm. The second array of ribs may have a height of less than or equal to about 75 µm, and a backweb thickness of less than or equal to about 100 µm.

Exemplary separators may have an overall thickness of between about 400 µm to about 2.0 mm.

In certain exemplary embodiments, the lead acid battery separator may have a first array of ribs being at least one from the group consisting of: solid ribs, broken ribs, discrete broken ribs, continuous ribs, discontinuous ribs, angled ribs, linear ribs, longitudinal ribs extending substantially in a machine direction of the porous membrane, lateral ribs extending substantially in a cross-machine direction of the porous membrane, transverse ribs extending substantially in a cross-machine direction of the porous membrane, cross ribs extending substantially in a cross-machine direction of the porous membrane, serrations, serrated ribs, battlements or battlemented ribs, curved or sinusoidal ribs, disposed in a solid or broken zig-zag-like fashion, grooves, channels, textured areas, embossments, dimples, porous, non-porous, mini ribs or cross-mini ribs, and combinations thereof.

In other select embodiments, the lead acid battery separator may have a second array of ribs being at least one from the group consisting of: solid ribs, broken ribs, discrete broken ribs, continuous ribs, discontinuous ribs, angled ribs, linear ribs, longitudinal ribs extending substantially in a machine direction of the porous membrane, lateral ribs extending substantially in a cross-machine direction of the porous membrane, transverse ribs extending substantially in a cross-machine direction of the porous membrane, cross ribs extending substantially in a cross-machine direction of the porous membrane, serrations, serrated ribs, battlements or battlemented ribs, curved or sinusoidal ribs, disposed in a solid or broken zig-zag-like fashion, grooves, channels, textured areas, embossments, dimples, porous, non-porous, mini ribs or cross-mini ribs, and combinations thereof.

In select embodiments, the present invention provides a lead acid battery provided with a separator as substantially described herein. The battery may be a flat-plate battery, a tubular battery, a flooded lead acid battery, an enhanced flooded lead acid battery, a deep-cycle battery, an absorptive glass mat battery, a tubular battery, an inverter battery, a vehicle battery, a starting-lighting-ignition ("SLI") battery, an idle-start-stop ("ISS") battery, an automobile battery, a truck battery, a motorcycle battery, an all-terrain vehicle battery, a forklift battery, a golf cart battery, a hybrid-electric vehicle battery, an electric vehicle battery, an e-rickshaw battery, an e-bike battery, or a marine vessel battery.

The battery may operate in a partial state of charge; while in motion; or while stationary; or cycle through all of the above.

In certain select embodiments, the present invention provides a vehicle provided with a lead acid battery provided with a separator as substantially described herein. The vehicle may be an automobile, a truck, a motorcycle, an all-terrain vehicle, a forklift, a golf cart, an idle-start-stop vehicle; a hybrid-electric vehicle, an electric vehicle, an e-rickshaw, an e-bike, or a marine vessel.

Novel or improved separators, battery separators, enhanced flooded battery separators, batteries, cells, systems, methods, and/or methods of manufacture and/or use of such separators, battery separators, enhanced flooded battery separators, cells, systems, and/or batteries; novel or improved battery separators for enhanced flooded batteries; methods, systems, and battery separators having a reduced ER, improved puncture strength, improved separator CMD stiffness, improved oxidation resistance, reduced separator thickness, reduced basis weight, and any combination thereof; an improved separator for enhanced flooded batteries wherein the separator has a reduced ER, improved puncture strength, improved separator CMD stiffness, improved oxidation resistance, reduced separator thickness, reduced basis weight, or any combination thereof; separators are provided that include or exhibit a reduced ER, improved puncture strength, improved separator CMD stiffness, improved oxidation resistance, reduced separator thickness, reduced basis weight, and any combination thereof; separators are provided in battery applications for flat-plate batteries, tubular batteries, vehicle SLI, and HEV ISS applications, deep cycle applications, golf car or golf cart, and e-rickshaw batteries, batteries operating in a partial state of charge ("PSOC"), inverter batteries; and storage batteries for renewable energy sources, and any combination thereof; and/or the like as shown, claimed or described herein.

In accordance with at least selected embodiments, aspects or objects, disclosed herein or provided are novel or improved separators, battery separators, enhanced flooded battery separators, batteries, cells, and/or methods of manufacture and/or use of such separators, battery separators, enhanced flooded battery separators, cells, and/or batteries. In accordance with at least certain embodiments, the present disclosure or invention is directed to novel or improved battery separators for enhanced flooded batteries. In addition, there is disclosed herein methods, systems, and battery separators having a reduced ER, improved puncture strength, improved separator CMD stiffness, improved oxidation resistance, reduced separator thickness, reduced basis weight, and any combination thereof. In accordance with at least particular embodiments, the present disclosure or invention is directed to an improved separator for enhanced flooded batteries wherein the separator has a reduced ER, improved puncture strength, improved separator CMD stiffness, improved oxidation resistance, reduced separator thickness, reduced basis weight, or any combination thereof. In accordance with at least certain embodiments, separators are provided that include or exhibit a reduced ER, improved puncture strength, improved separator CMD stiffness, improved oxidation resistance, reduced separator thickness, reduced basis weight, and any combination thereof. In accordance with at least certain embodiments, separators are provided in battery applications for flat-plate batteries, tubular batteries, vehicle SLI, and HEV ISS applications, deep cycle applications, golf car or golf cart and e-rickshaw batteries, batteries operating in a partial state of charge ("PSOC"), inverter batteries; and storage batteries for renewable energy sources, and any combination thereof.

In accordance with at least selected embodiments, the present disclosure or invention is directed to novel or improved membranes, separators, battery separators, enhanced flooded battery separators, batteries, cells, systems, methods, and/or vehicles using the same, and/or methods of manufacture and/or use of such separators, battery separators, enhanced flooded battery separators, batteries, cells, systems, and/or vehicles using the same. In accordance with at least certain embodiments, the present disclosure or invention is directed to novel or improved enhanced flooded lead acid battery separators for inverter batteries, flooded batteries for deep cycle applications, vehicle batteries, such as automotive starting lighting ignition ("SLI") batteries, batteries for automotive idle-start-stop ("ISS") applications, such as those used in hybrid-electric vehicles, and/or enhanced flooded batteries ("EFB") and/or improved methods of making and/or using such improved separators, cells, batteries, systems, vehicles, and/or the like. In accordance with at least certain embodiments, the present disclosure or invention is directed to an improved separator for enhanced flooded batteries and/or improved methods of making, testing, and/or using such batteries having such improved separators. In accordance with at least selected embodiments, the present disclosure or invention is directed to separators, particularly separators for enhanced flooded batteries having reduced separator electrical resistance ("ER"), reduced separator thickness, increased separator puncture strength, improved separator cross-machine direction ("CMD") stiffness, improved separator oxidation resistance, lowered separator basis weight, increased separator wettability, or any combination thereof. In addition, disclosed herein are methods, systems, and battery separators for enhancing battery life, reducing water loss, increasing wettability, reducing internal resistance, and/or improving uniformity in at least enhanced flooded batteries. In accordance with at least particular embodiments, the present disclosure or invention is directed to an improved separator for enhanced flooded batteries wherein the separator includes one or more performance enhancing additives or coatings, reduced electrical resistance, reduced thickness, increased puncture strength, improved CMD stiffness, improved oxidation resistance, lowered basis weight, or any combination thereof.

In accordance with at least certain possibly preferred embodiments, aspects or objects, a membrane, separator membrane or separator is provided with a novel construction and/or a combination of improved properties. Batteries, methods, and systems associated therewith are also provided. In certain embodiments, novel or improved separators, battery separators, enhanced flooded battery separators, batteries, cells, and/or methods of manufacture and/or use of such separators, battery separators, enhanced flooded battery separators, cells, and/or batteries are provided. In addition, there is disclosed herein methods, systems, and battery separators having a reduced ER, improved puncture strength, improved separator CMD stiffness, improved oxidation resistance, reduced separator thickness, reduced basis weight, and any combination thereof. In accordance with at least certain embodiments, separators are provided in battery applications for flat-plate batteries, tubular batteries, vehicle SLI, and HEV ISS applications, deep cycle applications, golf car or golf cart, and e-rickshaw batteries, batteries operating in a partial state of charge ("PSOC"), inverter batteries; and storage batteries for renewable energy sources, and any combination thereof.

In accordance with at least certain possibly preferred embodiments, aspects or objects, there is provided or disclosed:

A lead acid battery separator comprising:
  at least one membrane having a basis weight of approximately 140 g/m$^2$ or less, and
  a bending stiffness in the cross-machine direction of greater than or equal to approximately 25 mN.
The above separator, wherein the membrane having a basis weight of approximately 135 g/m$^2$ or less, and
  a bending stiffness in the cross-machine direction of greater than or equal to approximately 25 mN.
The above separator, wherein the membrane having a basis weight of approximately 130 g/m$^2$ or less, and
  a bending stiffness in the cross-machine direction of greater than or equal to approximately 25 mN.
The above separator, wherein the membrane having an electrical resistance of less than or equal to approximately 40 mΩ·cm$^2$ and an average puncture resistance of greater than or equal to approximately 9.0 N.
The above separator, wherein the membrane having an electrical resistance of less than or equal to approximately 40 mΩ·cm$^2$.
The above separator, wherein the membrane having an average puncture resistance of greater than or equal to approximately 10.0 N.
The above separator, wherein the membrane having an average puncture resistance of greater than or equal to approximately 12.0 N.

The above separator, wherein the membrane having an average puncture resistance of greater than or equal to approximately 14.0 N.

The present invention may be embodied in other forms without departing from the spirit and the essential attributes thereof, and, accordingly, reference should be made to the appended claims, rather than to the foregoing specification, as indicating the scope of the invention.

The foregoing written description of structures and methods has been presented for purposes of illustration only. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

As used in the specification and the appended claims, the singular forms "a," "an," and "the" include plural referents unless the context clearly dictates otherwise. Ranges may be expressed herein as from "about" or "approximately" one particular value, and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" can be used in place of "comprising" and "including" to provide for more specific embodiments of the invention and are also disclosed. "Exemplary" means "an example of" and is not intended to convey an indication of a preferred or ideal embodiment. Similarly, "such as" is not used in a restrictive sense, but for explanatory or exemplary purposes.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

Additionally, the invention illustratively disclosed herein suitably may be practiced in the absence of any element which is not specifically disclosed herein.

What is claimed is:

1. A lead acid battery separator comprising:
   a porous membrane, said porous membrane having a backweb, when placed in a battery, the backweb has a positive surface that faces a positive electrode and a negative surface that faces a negative electrode, the positive surface having machine direction positive ribs which extend in a machine direction, the negative surface having cross machine direction negative ribs which extend in a cross machine direction, the machine direction positive ribs extending from 8 microns to 1 mm above the backweb positive surface and the positive machine direction ribs are spaced 1 micron to 20 mm apart, the cross machine direction negative ribs extending 50 to 75 microns above the negative surface of the backweb and spaced more closely than the spacing of the machine direction positive ribs.

2. The lead acid battery separator of claim 1, wherein the oxidation resistance at 40 hours is approximately 200% or greater.

3. The lead acid battery separator of claim 1, wherein said porous membrane has a puncture resistance of approximately 9 N or greater.

4. The lead acid battery separator of claim 1, wherein said porous membrane has a puncture resistance of approximately 12 N or greater.

5. The lead acid battery separator of claim 1, wherein said porous membrane has a stiffness in a cross-machine direction of approximately 20 mN or greater.

6. The lead acid battery separator of claim 1, wherein said porous membrane has a stiffness in a cross-machine direction of approximately 25 mN or greater.

7. The lead acid battery separator of claim 1, wherein said porous membrane is ribbed.

8. The lead acid battery separator of claim 1, wherein said porous membrane comprises one from the group consisting of: ribs, grooves, textured areas, serrations or serrated ribs, solid ribs, battlements or battlemented ribs, broken ribs, angled ribs, linear ribs, or curved or sinusoidal ribs, zig-zag ribs, embossments or embossed ribs, dimples, negative cross-ribs, and a combination thereof.

9. The lead acid battery separator of claim 1, wherein said porous membrane is selected from the group consisting of:

polyolefin, polyethylene, polypropylene, rubber, polyvinyl chloride, phenolic resins, cellulosic, synthetic wood pulp, glass fibers, synthetic fibers, natural rubbers, synthetic rubbers, latex, and a combination thereof.

10. The lead acid battery separator of claim 9, wherein said porous membrane is polyethylene.

11. The lead acid battery separator of claim 1, wherein said porous membrane comprises a particle-like filler, said particle-like filler is selected from the group consisting of: dry finely divided silica, precipitated silica, amorphous silica, alumina, talc, and a combination thereof.

12. The lead acid battery separator of claim 1, wherein said porous membrane comprises an additive.

13. The lead acid battery separator of claim 12, wherein said additive is selected from the group consisting of: a non-ionic surfactant, an ionic surfactant, an anionic surfactant, wetting agents, colorants, antistatic additives, UV-protection additives, antioxidants, and a combination thereof.

14. The lead acid battery separator of claim 1, further comprising a fibrous mat.

15. The lead acid battery separator of claim 1, wherein said porous membrane comprises negative cross-ribs.

16. A lead acid battery comprising: a separator as defined by claim 1.

17. The lead acid battery of claim 16, wherein said battery is selected from the group consisting of: a flat-plate battery, a flooded lead acid battery, an enhanced flooded lead acid battery, a deep-cycle battery, an absorptive glass mat battery, a tubular battery, an inverter battery, a vehicle battery, a SLI battery, an ISS battery, an automobile battery, a truck battery, a motorcycle battery, an all-terrain vehicle battery, a forklift battery, a golf cart battery, a hybrid-electric vehicle battery, an electric vehicle battery, an e-rickshaw battery, and an e-bike battery.

18. The lead acid battery of claim 16, wherein said battery operates in a partial state of charge, operates while in motion, or operates while stationary.

19. A system comprising: a lead acid battery as defined by claim 16, wherein said lead acid battery operates in a partial state of charge.

* * * * *